(12) United States Patent
Azuma et al.

(10) Patent No.: US 7,002,551 B2
(45) Date of Patent: Feb. 21, 2006

(54) OPTICAL SEE-THROUGH AUGMENTED REALITY MODIFIED-SCALE DISPLAY

(75) Inventors: Ronald T. Azuma, Santa Monica, CA (US); Ron Sarfaty, Malibu, CA (US)

(73) Assignee: HRL Laboratories, LLC

( * ) Notice: Subject to any disclaimer, the term of this patent is extended or adjusted under 35 U.S.C. 154(b) by 161 days.

(21) Appl. No.: 10/256,090

(22) Filed: Sep. 25, 2002

(65) Prior Publication Data

US 2004/0051680 A1    Mar. 18, 2004

(51) Int. Cl.
*G09G 5/08* (2006.01)
(52) U.S. Cl. ............................... 345/158; 345/633
(58) Field of Classification Search ............. 345/633
See application file for complete search history.

(56) References Cited

U.S. PATENT DOCUMENTS

| | | | |
|---|---|---|---|
| 4,949,089 A | 8/1990 | Ruszkowski, Jr. | |
| 4,970,666 A | 11/1990 | Welsh et al. | |
| 5,025,261 A | 6/1991 | Ohta et al. | |
| 5,077,557 A | 12/1991 | Ingensand | |
| 5,227,985 A | 7/1993 | DeMenthon | |
| 5,267,014 A | 11/1993 | Prenninger | |
| 5,267,042 A | 11/1993 | Tsuchiya et al. | |
| 5,296,844 A | 3/1994 | Hanrahan et al. | |
| 5,297,061 A | 3/1994 | Dementhon et al. | |
| 5,311,203 A | 5/1994 | Norton | |
| 5,335,072 A | 8/1994 | Tanaka et al. | |
| 5,374,933 A | 12/1994 | Kao | |
| 5,388,059 A | 2/1995 | DeMenthon | |
| 5,394,517 A | 2/1995 | Kalawsky | |
| 5,412,569 A | 5/1995 | Corby, Jr. et al. | |
| 5,414,462 A | 5/1995 | Veatch | |
| 5,446,834 A | 8/1995 | Deering | |
| 5,471,541 A | 11/1995 | Burtnyk et al. | |
| 5,479,597 A | 12/1995 | Fellous | |
| 5,499,294 A | 3/1996 | Friedman | |
| 5,517,419 A | 5/1996 | Lanckton et al. | |
| 5,526,022 A | 6/1996 | Donahue et al. | |
| 5,528,232 A | 6/1996 | Verma et al. | |
| 5,528,518 A | 6/1996 | Bradshaw et al. | |
| 5,550,758 A | 8/1996 | Corby, Jr. et al. | |
| 5,553,211 A | 9/1996 | Uotani | |

(Continued)

OTHER PUBLICATIONS

C. C. Lee, "Fuzzy Logic in control systems: Fuzzy logic controller—Part II", IEEE Transactions on Systems, Man, and Cybernetics, vol. 15, pp. 419-435, Mar./Apr. 1990.

S. Marriott and R. F. Harrison, "A modified fuzzy ARTMAP architecture for approximation of moisy mappings", Neural Networks, vol. 9, pp. 881-997, 1996.

(Continued)

*Primary Examiner*—Sumati Lefkowitz
*Assistant Examiner*—Motilewa Good-Johnson
(74) *Attorney, Agent, or Firm*—Tope-McKay & Associates

(57) ABSTRACT

A method and system for providing an optical see-through Augmented Reality modified-scale display. This aspect includes a sensor suite 100 which includes a compass 102, an inertial measuring unit 104, and a video camera 106 for precise measurement of a user's current orientation and angular rotation rate. A sensor fusion module 108 may be included to produce a unified estimate of the user's angular rotation rate and current orientation to be provided to an orientation and rate estimate module 120. The orientation and rate estimate module 120 operates in a static or dynamic (prediction) mode. A render module 140 receives an orientation; and the render module 140 uses the orientation, a position from a position measuring system 142, and data from a database 144 to render graphic images of an object in their correct orientations and positions in an optical display 150.

25 Claims, 23 Drawing Sheets

U.S. PATENT DOCUMENTS

| | | | |
|---|---|---|---|
| 5,585,813 | A | 12/1996 | Howard |
| 5,592,401 | A | 1/1997 | Kramer |
| 5,596,494 | A | 1/1997 | Kuo |
| 5,625,765 | A | 4/1997 | Ellenby et al. |
| 5,633,946 | A | 5/1997 | Lachinski et al. |
| 5,642,285 | A | 6/1997 | Woo et al. |
| 5,652,717 | A | 7/1997 | Miller et al. |
| 5,671,342 | A | 9/1997 | Miller et al. |
| 5,672,820 | A | 9/1997 | Rossi et al. |
| 5,699,444 | A | 12/1997 | Palm |
| 5,706,195 | A | 1/1998 | Corby, Jr. et al. |
| 5,719,949 | A | 2/1998 | Koeln et al. |
| 5,732,182 | A | 3/1998 | Masuda et al. |
| 5,740,804 | A | 4/1998 | Cerofolini |
| 5,741,521 | A | 4/1998 | Knight et al. |
| 5,742,263 | A | 4/1998 | Wang et al. |
| 5,745,387 | A | 4/1998 | Corby, Jr. et al. |
| 5,764,770 | A | 6/1998 | Schipper et al. |
| 5,768,640 | A | 6/1998 | Takahashi et al. |
| 5,815,411 | A * | 9/1998 | Ellenby et al. ............. 702/150 |
| 5,825,480 | A | 10/1998 | Udagawa |
| 5,841,439 | A | 11/1998 | Pose et al. |
| 5,844,505 | A | 12/1998 | Van Ryzin |
| 5,850,352 | A | 12/1998 | Moezzi et al. |
| 5,870,136 | A | 2/1999 | Fuchs et al. |
| 5,894,323 | A | 4/1999 | Kain et al. |
| 5,902,347 | A | 5/1999 | Backman et al. |
| 5,912,720 | A | 6/1999 | Berger et al. |
| 5,913,078 | A | 6/1999 | Kimura et al. |
| 5,914,748 | A | 6/1999 | Parulski et al. |
| 5,926,116 | A | 7/1999 | Kitano et al. |
| 5,982,301 | A | 11/1999 | Ohta et al. |
| 5,995,214 | A | 11/1999 | Bruckstein et al. |
| 6,016,606 | A | 1/2000 | Oliver et al. |
| 6,021,371 | A | 2/2000 | Fultz |
| 6,023,241 | A | 2/2000 | Clapper |
| 6,023,278 | A | 2/2000 | Margolin |
| 6,024,655 | A | 2/2000 | Coffee |
| 6,025,790 | A | 2/2000 | Saneyoshi |
| 6,031,545 | A | 2/2000 | Ellenby et al. |
| 6,037,936 | A | 3/2000 | Ellenby et al. |
| 6,046,689 | A | 4/2000 | Newman |
| 6,049,622 | A | 4/2000 | Robb et al. |
| 6,055,477 | A | 4/2000 | McBurney et al. |
| 6,055,478 | A | 4/2000 | Heron |
| 6,064,398 | A | 5/2000 | Ellenby et al. |
| 6,064,749 | A | 5/2000 | Hirota et al. |
| 6,064,942 | A | 5/2000 | Johnson et al. |
| 6,078,865 | A | 6/2000 | Koyanagi |
| 6,081,609 | A | 6/2000 | Narioka |
| 6,083,353 | A | 7/2000 | Alexander, Jr. |
| 6,084,556 | A * | 7/2000 | Zwern ............................ 345/8 |
| 6,084,989 | A | 7/2000 | Eppler |
| 6,085,148 | A | 7/2000 | Jamison et al. |
| 6,091,424 | A | 7/2000 | Madden et al. |
| 6,091,816 | A | 7/2000 | Woo |
| 6,097,337 | A | 8/2000 | Bisio |
| 6,098,015 | A | 8/2000 | Nimura et al. |
| 6,100,925 | A | 8/2000 | Rosser et al. |
| 6,101,455 | A | 8/2000 | Davis |
| 6,107,961 | A | 8/2000 | Takagi |
| 6,115,611 | A | 9/2000 | Kimoto et al. |
| 6,119,065 | A | 9/2000 | Shimada et al. |
| 6,127,945 | A | 10/2000 | Mura-Smith |
| 6,128,571 | A | 10/2000 | Ito et al. |
| 6,144,318 | A | 11/2000 | Hayashi et al. |
| 6,161,131 | A | 12/2000 | Garfinkle |
| 6,166,744 | A * | 12/2000 | Jaszlics et al. ............. 345/629 |
| 6,169,955 | B1 | 1/2001 | Fultz |
| 6,173,239 | B1 | 1/2001 | Ellenby |
| 6,175,343 | B1 | 1/2001 | Mitchell et al. |
| 6,175,802 | B1 | 1/2001 | Okude et al. |
| 6,176,837 | B1 | 1/2001 | Foxlin |
| 6,178,377 | B1 | 1/2001 | Ishihara et al. |
| 6,181,302 | B1 | 1/2001 | Lynde |
| 6,182,010 | B1 | 1/2001 | Berstis |
| 6,199,014 | B1 | 3/2001 | Walker et al. |
| 6,199,015 | B1 | 3/2001 | Curtwright et al. |
| 6,202,026 | B1 | 3/2001 | Nimura et al. |
| 6,208,933 | B1 | 3/2001 | Lazar |
| 6,222,482 | B1 | 4/2001 | Gueziec |
| 6,222,985 | B1 | 4/2001 | Miyake |
| 6,233,520 | B1 | 5/2001 | Ito et al. |
| 6,240,218 | B1 | 5/2001 | Michael et al. |
| 6,243,599 | B1 | 6/2001 | Van Horn |
| 6,247,019 | B1 | 6/2001 | Davies |
| 6,414,696 | B1 * | 7/2002 | Ellenby et al. ............. 345/762 |
| 6,535,210 | B1 * | 3/2003 | Ellenby et al. ............. 345/419 |
| 6,653,990 | B1 * | 11/2003 | Lestruhaut ..................... 345/8 |
| 2002/0036617 | A1 * | 3/2002 | Pryor ......................... 345/156 |

OTHER PUBLICATIONS

N. Srinivasa, "Learning and generalization of Noisy Mappings Using a Modified PROBART Neural Network", IEEE Transactions on Signal Processing, vol. 45, No. 10, pp. 2533-2550, Oct. 1997.

J. S. Jang, "ANFIS: Adaptive-networked-based fuzzy interference system", IEEE Transactions on Systems, Man, and Cybernetics, vol. 23, pp. 665-685, May, 1993.

L. X. Wang and J. M. Mendel, "Generating fuzzy rules by learning from examples", IEEE Transactions on Systems, Man, and Cybernetics, vol. 22, No. 6, pp. 1414-1427, Nov./Dec. 1992.

T. Takagi and M. Seguno, "Fuzzy identification of systems and its applications to modeling and control", IEEE Transactions on Systems, Man, and Cybernetics, vol. 15, pp. 116-132, Jan. 1985.

K. Beyer, J. Goldstein, R. Ramakrishnan, and U. Shaft, "When is Nearest Neighbor Meaningful?", Proc. Of Seventh International Conference on Database Theory, Jerusalem, Israel, 1999.

C. F. Juang and C. T. Lin, "An On-Line Self-Constructing Neural Fuzzy Inference Network and Its Application", IEEE Transactions on Fuzzy Systems, vol. 6, No. 1, pp. 12-32, Feb. 1998.

G. A. Carpenter and S. Grossberg, "The ART of adaptive pattern recognition by a self-organizing neural network", Computer, vol. 21, pp. 77-88, 1988.

G. A. Carpenter, S. Grossberg, N. Markuzon, J. H. Reynolds, and D. B. Rosen, "Fuzzy ARTMAP: A Neural Network Architecture for Incremental Supervised Learning of Analog Multidimensional Maps", IEEE Transactions on Neural Networks, vol. 3, No. 5, pp. 698-712, Sep. 1992.

J. R. Williamson, "Gaussian ARTMAP: A neural network for fast incremental learning of noisy multidimensional maps", Neural Networks, vol. 9, pp. 881-997, 1996.

R.T. Azuma, "A Survey of Augmented Reality," Presence: Teleoperators and virtual environments 6,4 (Aug. 1997), 355-385.

Cavallaro, Rick, "The FoxTrax Hockey Puck Trucking System," IEEE Computer Graphics & Applications 17,2 (Mar-Apr. 1997), 6-12.

R. Azuma, B. Hoff, H. Neely III, R. Sarfaty, "A Motion-Stabilized Outdoor Augmented Reality System," Proceedings of IEEE Virtual Reality '99 (Houston, TX, Mar. 13-17, 1999), 252-259.

* cited by examiner

OPTICAL SEE-THROUGH AUGMENTED REALITY MODIFIED-SCALE DISPLAY

STATEMENT OF GOVERNMENT RIGHTS

This invention is used in conjunction with DARPA ITO contracts #N00019-97-C-2013, "GRIDS", and #N00019-99-2-1616, "Direct Visualization of the Electronic Battlefield", and the U.S. Government may have certain rights in this invention.

TECHNICAL FIELD

The present invention is related to the field of Augmented Reality (AR). More specifically, this invention presents a method and an apparatus for using an optical display and sensing technologies to superimpose, in real time, graphical information upon a user's magnified view of the real world.

BACKGROUND

Augmented Reality (AR) enhances a user's perception of, and interaction with, the real world. Virtual objects are used to display information that the user cannot directly detect with the user's senses. The information conveyed by the virtual objects helps a user perform real-world tasks. Many prototype AR systems have been built in the past, typically taking one of two forms. In one form, they are based on video approaches, wherein the view of the real world is digitized by a video camera and is then composited with computer graphics. In the other form, they are based on an optical approach, wherein the user directly sees the real world through some optics with the graphics optically merged in. An optical approach has the following advantages over a video approach: 1) Simplicity: Optical blending is simpler and cheaper than video blending. Optical see-through Head-Up Displays (HUDs) with narrow field-of-view combiners offer views of the real world that have little distortion. Also, there is only one "stream" of video to worry about: the graphic images. The real world is seen directly through the combiners, which generally have a time delay of a few nanoseconds. Time delay, as discussed herein, means the period between when a change occurs in the actual scene and when the user can view the changed scene. Video blending, on the other hand, must deal with separate video streams for the real and virtual images. Both streams have inherent delays in the tens of milliseconds. 2) Resolution: Video blending limits the resolution of what the user sees, both real and virtual, to the resolution of the display devices, while optical blending does not reduce the resolution of the real world. On the other hand, an optical approach has the following disadvantages with respect to a video approach: 1) Real and virtual view delays are difficult to match. The optical approach offers an almost instantaneous view of the real world, but the view of the virtual is delayed. 2) In optical see-through, the only information the system has about the user's head location comes from the head tracker. Video blending provides another source of information, the digitized image of the real scene. Currently, optical approaches do not have this additional registration strategy available to them. 3) The video approach is easier to match the brightness of real and virtual objects. Ideally, the brightness of the real and virtual objects should be appropriately matched. The human eye can distinguish contrast on the order of about eleven orders of magnitude in terms of brightness. Most display devices cannot come close to this level of contrast. AR displays with magnified views have been built with video approaches. Examples include U.S. Pat. No. 5,625,765, titled Vision Systems Including Devices And Methods For Combining Images For Extended Magnification Schemes; the FoxTrax Hockey Puck Tracking System, [Cavallaro, Rick. The FoxTrax Hockey Puck Tracking System. IEEE Computer Graphics & Applications 17, 2 (March–April 1997), 6–12.]; and the display of the virtual "first down" marker that has been shown on some football broadcasts.

A need exists in the art for magnified AR views using optical approaches. With such a system, a person could view an optical magnified image with more details than the person could with the naked eye along with a better resolution and quality of image. Binoculars provide much higher quality images than a video camera with a zoom lens. The resolution of video sensing and video display elements is limited, as is the contrast and brightness. One of the most basic problems limiting AR applications is the registration problem. The objects in the real and virtual worlds must be properly aligned with respect to each other, or the illusion that the two worlds coexist will be compromised. The biggest single obstacle to building effective AR systems is the requirement of accurate, long-range sensors and trackers that report the locations of the user and the surrounding objects in the environment. Conceptually, anything not detectable by human senses but detectable by machines might be transduced into something that a user can sense in an AR system. Few trackers currently meet all the needed specifications, and every technology has weaknesses. Without accurate registration, AR will not be accepted in many applications. Registration errors are difficult to adequately control because of the high accuracy requirements and the numerous sources of error. Magnified optical views would require even more sensitive registration. However, registration and sensing errors have been two of the basic problems in building effective magnified optical AR systems.

Therefore, it would be desirable to provide an AR system having magnified optics for 1) generating high quality resolution and improved image quality; 2) providing a wider range of contrast and brightness; and 3) improving measurement precision and providing orientation predicting ability in order to overcome registration problems.

The following references are provided for additional information:

S. You, U. Neumann, & R. Azuma: Hybrid Inertial and Vision Tracking for Augmented Reality Registration. IEEE Virtual Reality '99 Conference (Mar. 13–17, 1999), 260–267.

Azuma, Ronald and Gary Bishop. Improving Static and Dynamic Registration in an Optical See-Through HMD. Proceedings of SIGGRAPH '94 (Orlando, Fla., 24–29 Jul., 1994), Computer Graphics, Annual Conference Series, 1994, 197–204.

Computer Graphics: Principles and Practice ($2^{nd}$ edition). James D. Foley, Andries van Dam, Steven K. Feiner, John F. Hughes. Addison-Wesley, 1990.

Lisa Gottesfeld Brown, A Survey of Image Registration Techniques. ACM Computing Surveys, vol. 24, #4, 1992, pp. 325–376.

SUMMARY OF THE PRESENT INVENTION

It is a primary object of the present invention to provide a system and a method for providing an optical see-through augmented reality modified-scale display. Non-limiting examples of applications of the present invention include: A person looking through a pair of binoculars might see various sights but not know what they are. With the augmented view provided by the present invention, virtual annotations could attach labels identifying the sights that the person is seeing or draw virtual three-dimension models that show what a proposed new building would look like, or provide cutaway views inside structures, simulating X-ray vision. A soldier could look through a pair of augmented binoculars and see electronic battlefield information directly superimposed upon his view of the real world (labels indicating hidden locations of enemy forces, land mines, locations of friendly forces, and the objective and the path to follow). A spectator in a stadium could see the names of the players on the floor and any relevant information attached to those players. A person viewing an opera through augmented opera glasses could see the English "subtitles" of what each character is saying directly next to the character who is saying it, making the translation much clearer than existing super titles.

The apparatus of the present invention, in one aspect, comprises an optical see-through imaging apparatus having variable magnification for producing an augmented image from a real scene and a computer generated image. The apparatus comprises a sensor suite for precise measurement of a user's current orientation; a render module connected with the sensor suite for receiving a sensor suite output comprising the user's current orientation for use in producing the computer generated image of an object to combine with the real scene; a position measuring system connected with the render module for providing a position estimation for producing the computer generated image of the object to combine with the real scene; a database connected with the render module for providing data for producing the computer generated image of the object to combine with the real scene; and an optical display connected with the render module configured to receive an optical view of the real scene, and for combining the optical view of the real scene with the computer generated image of the object from the render module to produce a display based on the user's current position and orientation for a user to view.

In another aspect the sensor suite may further include an inertial measuring unit that includes at least one inertial angular rate sensor; and the apparatus further includes a sensor fusion module connected with the inertial measuring unit for accepting an inertial measurement including a user's angular rotation rate for use in determining a unified estimate of the user's angular rotation rate and current orientation; the render module is connected with the sensor fusion module for receiving a sensor fusion module output consisting of the unified estimate of the user's angular rotation rate and current orientation from the sensor fusion module for use in producing the computer generated image of the object to combine with the real scene; and the optical display further utilizes the unified estimate of the user's angular rotation rate and current orientation from the sensor fusion module to produce a display based on the unified estimate of the user's current position and orientation for a user to view.

In yet another aspect, the sensor suite further may further include a compass. The sensor fusion module is connected with a sensor suite compass for accepting a sensor suite compass output from the sensor suite compass; and the sensor fusion module further uses the sensor suite compass output in determining the unified estimate of the user's angular rotation rate and current orientation with increased accuracy.

In another aspect, an apparatus of the present invention further includes an orientation and rate estimator module connected with the sensor fusion module for accepting the sensor fusion module output consisting of the unified estimate of the user's angular rotation rate and current orientation. When the user's angular rotation rate is determined to be above a pre-determined threshold, the orientation and rate estimator module predicts a future orientation; otherwise the orientation and rate estimator module uses the unified estimate of the user's current orientation to produce an average orientation. The render module is connected with the orientation and rate estimator module for receiving the predicted future orientation or the average orientation from the orientation and rate estimator module for use in producing the computer generated image of the object to combine with the real scene. The optical display is based on the predicted future orientation or the average orientation from the orientation and rate estimator module for the user to view.

In yet another aspect, the sensor suite further includes a sensor suite video camera; and the apparatus further includes a video feature recognition and tracking movement module connected between the sensor suite video camera and the sensor fusion module, wherein the sensor suite video camera provides a sensor suite video camera output, including video images, to the video feature recognition and tracking movement module, and wherein the video feature recognition and tracking movement module provides a video feature recognition and tracking movement module output to the sensor fusion module, which utilizes the video feature recognition and tracking movement module output to provide increased accuracy in determining the unified estimate of the user's angular rotation rate and current orientation.

In another aspect of this invention, the video feature recognition and tracking movement module includes a template matcher for more accurate registration of the video images for measuring the user's current orientation.

The present invention in another aspect comprises the method for an optical see-through imaging through an optical display having variable magnification for producing an augmented image from a real scene and a computer generated image. Specifically, the method comprises steps of:

a. measuring a user's current orientation by a sensor suite;

b. rendering the computer generated image by combining a sensor suite output connected with a render module, a position estimation output from a position measuring system connected with the render module, and a data output from a database connected with the render module;

c. displaying the combined optical view of the real scene and the computer generated image of an object in the user's current position and orientation for the user to view through the optical display connected with the render module; and d. repeating the measuring step through the displaying step to provide a continual update of the augmented image.

Another aspect, or aspect, of the present invention further includes the step of producing a unified estimate of a user's angular rotation rate and current orientation from a sensor fusion module connected with the sensor suite, wherein the sensor suite includes an inertial measuring unit that includes at least one inertial angular rate sensor for measuring the user's angular rotation rate; wherein the rendering of the computer generated image step includes a unified estimate of the user's angular rotation rate and current orientation from the sensor fusion module; and wherein the displaying of the combined optical view step includes the unified estimate of the user's angular rotation rate and current orientation.

An additional aspect, or aspect, of the present invention wherein the step of measuring precisely the user's current orientation by a sensor suite includes measuring the user's current orientation using a compass, and wherein the measurements produce the unified estimate of the user's angular rotation rate and current orientation with increased accuracy.

Yet another aspect, or aspect, of the present invention further includes the step of predicting a future orientation at the time a user will view a combined optical view by an orientation and rate estimate module connected with and using output from the sensor fusion module when the user's angular rotation rate is determined to be above a pre-determined threshold, otherwise using the unified estimate of the user's current orientation to produce an average orientation; wherein the rendering the computer generated image step may include a predicted future orientation output from the orientation and rate estimate module; and wherein the displaying of the combined optical view step may include a predicted future orientation.

In yet another aspect, or aspect, of the present invention, the step of measuring precisely the user's current orientation by a sensor suite further includes measuring the user's orientation using a video camera and a video feature recognition and tracking movement module. The video feature recognition and tracking movement module receives a sensor suite video camera output from a sensor suite video camera and provides the sensor fusion module measurements to enable the sensor fusion module to produce the unified estimate of the user's angular rotation rate and current orientation with increased accuracy.

In another aspect of the present invention, the step of measuring precisely the user's orientation further includes a template matcher within the video feature recognition and tracking movement module, and provides the sensor fusion module measurements to enable the sensor fusion module to produce the unified estimate of the user's angular rotation rate and current orientation with increased accuracy.

The present invention in another aspect comprises an orientation and rate estimator module for use with an optical see-through imaging apparatus, the module comprises a means for accepting a sensor fusion modular output consisting of the unified estimate of the user's angular rotation rate and current orientation; a means for using the sensor fusion modular output to generate a future orientation when the user's angular rotation rate is determined to be above a pre-determined threshold, otherwise the orientation and rate estimator module generates a unified estimate of the user's current orientation to produce an average orientation; and a means for outputting the future orientation or the average orientation from the orientation and rate estimator module for use in the optical see-through imaging apparatus for producing a display based on the unified estimate of the user's angular rotation rate and current orientation.

In another aspect, or aspect, of the present invention, the orientation and rate estimator module is configured to receive a sensor fusion module output wherein the sensor fusion module output includes data selected from the group consisting of an inertial measuring unit output, a compass output, and a video camera output.

The present invention in another aspect comprises a method for orientation and rate estimating for use with an optical see-through image apparatus, the method comprising the steps of accepting a sensor fusion modular output consisting of the unified estimate of the user's angular rotation rate and current orientation; using the sensor fusion modular output to generate a future orientation when the user's angular rotation rate is determined to be above a predetermined threshold, otherwise the orientation and rate estimator module generates a unified estimate of the user's current orientation to produce an average orientation; and outputting the future orientation or the average orientation from the orientation and rate estimator module for use in the optical see-through imaging apparatus for producing a display based on the unified estimate of the user's angular rotation rate and current orientation.

BRIEF DESCRIPTION OF THE DRAWINGS

These and other features, aspects, and advantages of the present invention will become better understood with regard to the following description, appended claims, and accompanying drawings where:

DETAILED DESCRIPTION

Figure 1A:
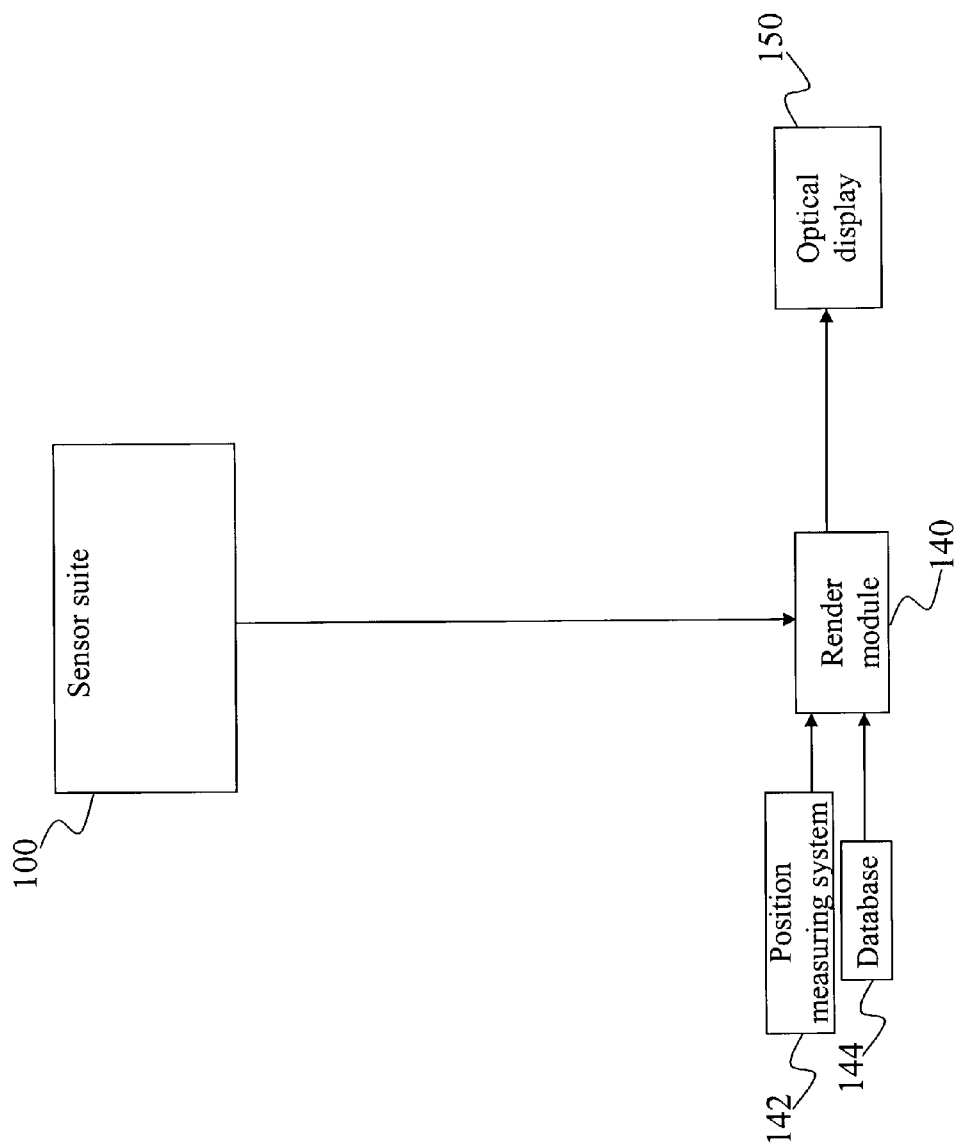
FIG. 1a is a block diagram depicting an aspect of the present invention.

The present invention relates to the field of Augmented Reality (AR). More specifically, this invention presents a method and apparatus for using an optical display and sensing technologies to superimpose, in real time, graphical information upon a user's magnified view of the real world, and may be tailored to a variety of applications. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

The present invention is useful for providing an optical see-through imaging apparatus having variable magnification for producing an augmented image from a real scene and a computer generated image. A few of the goals of the present invention include providing an AR system having magnified optics for 1) generating high quality resolution for improved image quality; 2) providing a wider range of contrast and brightness; and 3) improving measurement precision and providing orientation predicting ability in order to overcome registration problems.

In order to provide a working frame of reference, first a glossary of terms in the description and claims is given as a central resource for the reader. Next, a brief introduction is provided in the form of a narrative description of the present invention to give a conceptual understanding prior to developing the specific details.

Glossary

Before describing the specific details of the present invention, it is useful to provide a centralized location in which various terms used herein and in the claims are defined. The glossary provided is intended to provide the reader with a feel for the intended meaning of the terms, but is not intended to convey the entire scope of each term. Rather, the glossary is intended to supplement the rest of the specification in conveying the proper meaning for the terms used.

Augmented Reality (AR): A variation of Virtual Environments (VE), or Virtual Reality as it is more commonly called. VE technologies completely immerse a user inside a synthetic environment. While immersed, the user cannot see the real world. In contrast, AR allows the user to see the real world, with virtual objects superimposed upon or composited with the real world. Here, AR is defined as systems that have the following three characteristics: 1) combine real and virtual images, 2) interactive in real time, and 3) registered in three dimensions. The general system requirements for AR are: 1) a tracking and sensing component (to overcome the registration problem); 2) a scene generator component (render); and 3) a display device. AR refers to the general goal of overlaying three-dimensional virtual objects onto real world scenes, so that the virtual objects appear to coexist in the same space as the real world. The present invention includes the combination of using an optical see-through display that provides a magnified view of the real world, and the system required to make the display work effectively. A magnified view as it relates to the present invention means the use of a scale other than one to one.

Computer—This term is intended to broadly represent any data processing device having characteristics (processing power, etc.) allowing it to be used with the invention. The "computer" may be a general-purpose computer or may be a special purpose computer. The operations performed thereon may be in the form of either software or hardware, depending on the needs of a particular application.

Means: The term "means" as used with respect to this invention generally indicates a set of operations to be performed on a computer. Non-limiting examples of "means" include computer program code (source or object code) and "hard-coded" electronics. The "means" may be stored, for example, in the memory of a computer or on a computer readable medium.

Registration: As described herein, the term refers to the alignment of real and virtual objects. If the illusion that the virtual objects exist in the same 3-D environment as the real world is to be maintained, then the virtual must be properly registered (i.e., aligned) with the real at all times. For example, if the desired effect is to have a virtual soda can sitting on the edge of a real table, then the soda can must appear to be at that position no matter where the user's head moves. If the soda can moves around so that it floats above the table, or hangs in space off to the side of the table, or is too low so it interpenetrates the table, then the registration is not good.

Sensing: "Sensing," in general, refers to sensors taking some measurements of something. E.g., a pair of cameras may observe the location of a beacon in space and, from the images detected by the cameras, estimate the 3-D location of that beacon. So if a system is "sensing" the environment, then it is trying to measure some aspect(s) of the environment, e.g. the locations of people walking around. Note also that camera or video camera as used herein are generally intended to include any imaging device, non-limiting examples of which may include infrared cameras, ultraviolet cameras, as well as imagers that operate in other areas of the spectrum such as radar sensors.

User—This term, as used herein, means a device or person receiving output from the invention. For example, output may be provided to other systems for further processing or for dissemination to multiple people. In addition, the term "user" need not be interpreted in a singular fashion, as output may be provided to multiple "users."

Introduction

An overview of an aspect of the present invention is shown in FIG. 1a. FIGS. 1b through 1k are non-limiting examples of additional aspects that are variations of the aspect shown in FIG. 1a.

The aspect shown in FIG. 1a depicts an optical see-through imaging apparatus having variable magnifications for producing an augmented image from a real scene and a computer generated image. The optical see-through imaging apparatus comprises a sensor suite 100 for providing a precise measurement of a user's current orientation in the form of a sensor suite 100 output. A render module 140 is connected with the sensor suite 100 output comprising the user's current orientation, a position estimation from a position measuring system 142 is connected with the render module 140, and a database 144 is connected with the render module 140 wherein the database 144 includes data for producing the computer generated image of the object to combine with the real scene to render graphic images of an object, based on the user's current position and orientation. An optical display 150 connected with the render module 140 is configured to receive an optical view of the real scene in variable magnification and to combine the optical view with the computer generated image of the object from the render module 140 to produce a display based on the user's current position and orientation for a user to view.

Figure 1B:
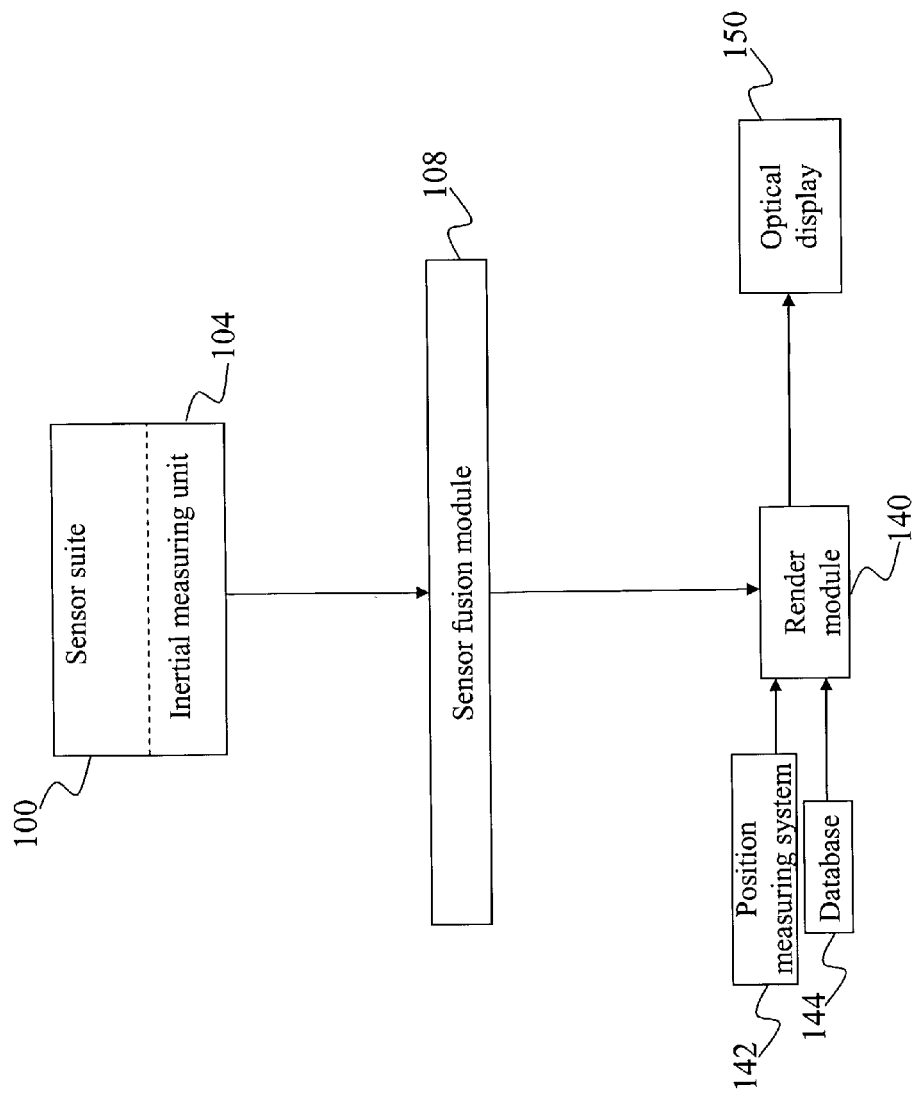
FIG. 1b is a block diagram depicting a modified aspect of the present invention as shown in FIG. 1a, further including an inertial measuring unit and a sensor fusion module.

FIG. 1*b* is a block diagram, which depicts a modified aspect of the present invention as shown in FIG. 1*a*, wherein the sensor suite 100 includes an inertial measuring unit 104, including at least one inertial angular rate sensor, for motion detection, and wherein a sensor fusion module 108 is connected with a sensor suite inertial measuring unit for accepting an inertial measurement including a user's angular rotation rate from the sensor suite 100 for use in determining a unified estimate of the user's angular rotation rate and current orientation. The render module 140 is connected with the sensor fusion module 108 for receiving a sensor fusion module 108 output consisting of the unified estimate of the user's angular rotation rate and current orientation from the sensor fusion module for use in producing the computer generated image of the object to combine with the real scene. The optical display 150 further utilizes the unified estimate of the user's angular rotation rate and current orientation from the sensor fusion module 108 to produce a display based on the unified estimate of the user's current position and orientation for a user to view.

Figure 1C:
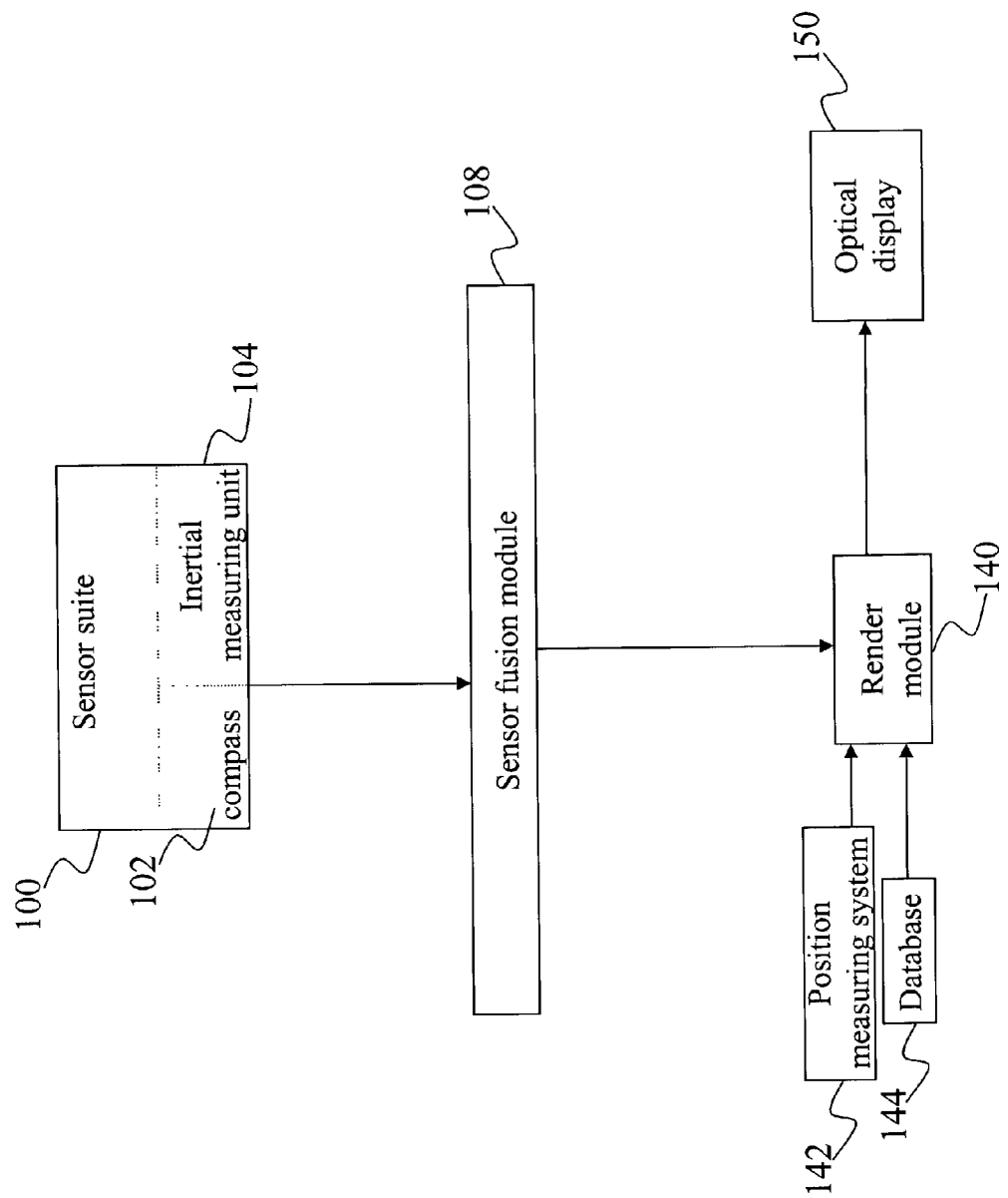
FIG. 1c is a block diagram depicting a modified aspect of the present invention as shown in FIG. 1b, further including a compass.

FIG. 1*c* depicts a modified aspect of the present invention shown in FIG. 1*b*, wherein the sensor suite 100 is modified to further include a compass 102 for direction detection for increasing the sensor suite 100 accuracy. The sensor fusion module 108 is connected with a sensor suite compass 102 for accepting a sensor suite compass 102 output there from. The sensor fusion module 108 further uses the sensor suite compass 102 output in determining the unified estimate of the user's angular rotation rate and current orientation with increased accuracy.

Figure 1D:
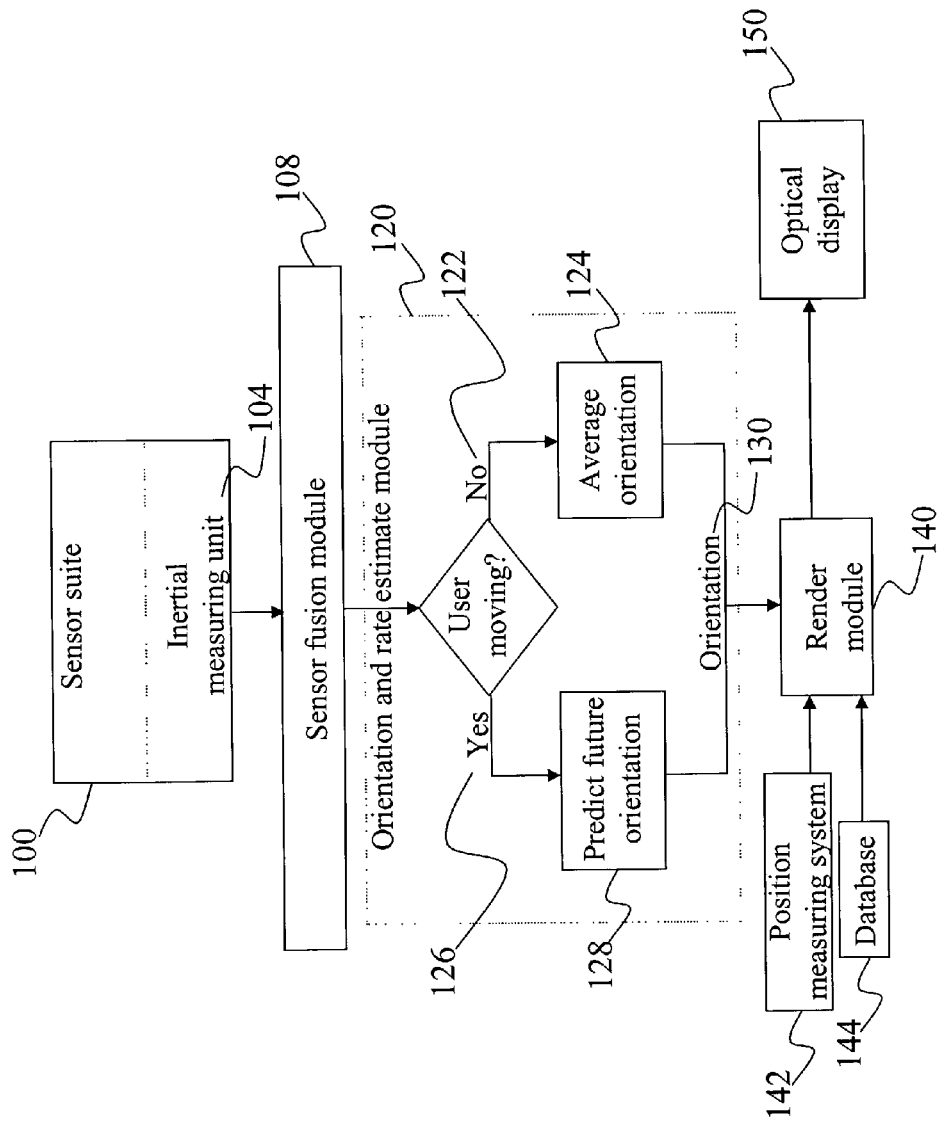
FIG. 1d is a block diagram depicting a modified aspect of the present invention as shown in FIG. 1b, further including an orientation and rate estimator module.

FIG. 1*d* further depicts a modified aspect of the present invention as shown in FIG. 1*b*, wherein the apparatus further includes an orientation and rate estimate module 120. The orientation and rate estimate module 120 is connected with the sensor fusion module 108 and the render module 140. The orientation and rate estimate module 120 accepts the sensor fusion module output consisting of the unified estimate of the user's angular rotation rate and current orientation. The orientation and rate estimate module 120 can operate in two modes. The first mode is a static mode, which occurs when the orientation and rate estimate module 120 determines that the user is not moving 122. This occurs when the user's angular rotation rate is determined to be less than a pre-determined threshold. In this mode, the orientation and rate estimate module 120 outputs an average orientation 124 as an orientation 130 output to a render module 140. The second mode is a dynamic mode that occurs when the orientation and rate estimate module 120 determines that the user is moving 126. This occurs when the user's angular rotation rate is determined to be above a pre-determined threshold. In this mode, the orientation and rate estimate module 120 determines a predicted future orientation 128 as the orientation 130 outputs to the render module 140. The render module 140 receives the predicted future orientation or the average orientation from the orientation and rate estimator module 120 for use in producing the computer generated image of the object to combine with the real scene. The optical display 150 for the user to view is based on the predicted future orientation or the average orientation from the orientation and rate estimator module 120.

Figure 1E:
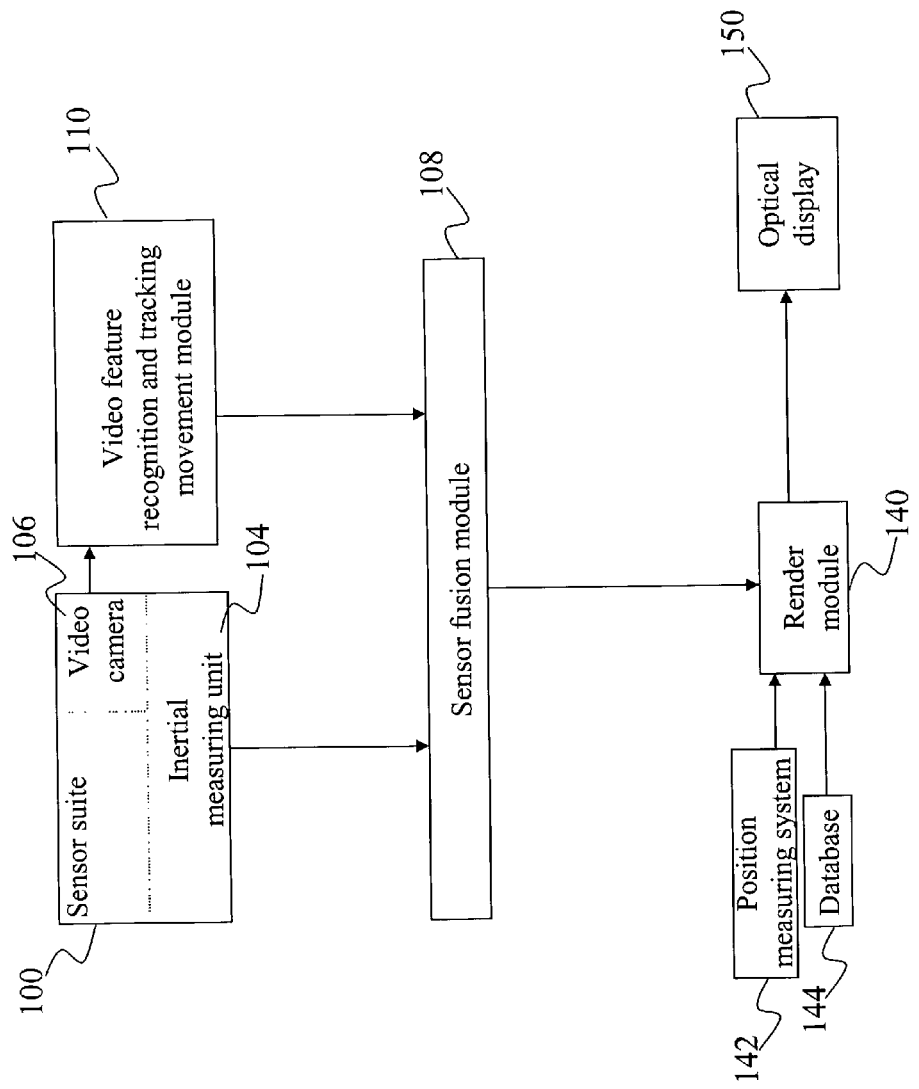
FIG. 1e is a block diagram depicting a modified aspect of the present invention as shown in FIG. 1b, further including a video camera and a video feature recognition and tracking movement module.

FIG. 1*e* depicts a modified aspect of the present invention shown in FIG. 1*b*, wherein the sensor suite 100 is modified to include a video camera 106, and a video feature recognition and tracking movement module 110. The video feature recognition and tracking movement module 110 is connected between the sensor suite video camera 106 and the sensor fusion module 108. The sensor suite video camera 106 provides a sensor suite video camera 106 output, including video images, to the video feature recognition and tracking movement module 110. The video feature recognition and tracking movement module 110 is designed to recognize known landmarks in the environment and to detect relative changes in the orientation from frame to frame. The video feature recognition and tracking movement module 110 provides video feature recognition and tracking movement module 110 output to the sensor fusion module 108 to provide increased accuracy in determining the unified estimate of the user's angular rotation rate and current orientation.

Figure 1F:
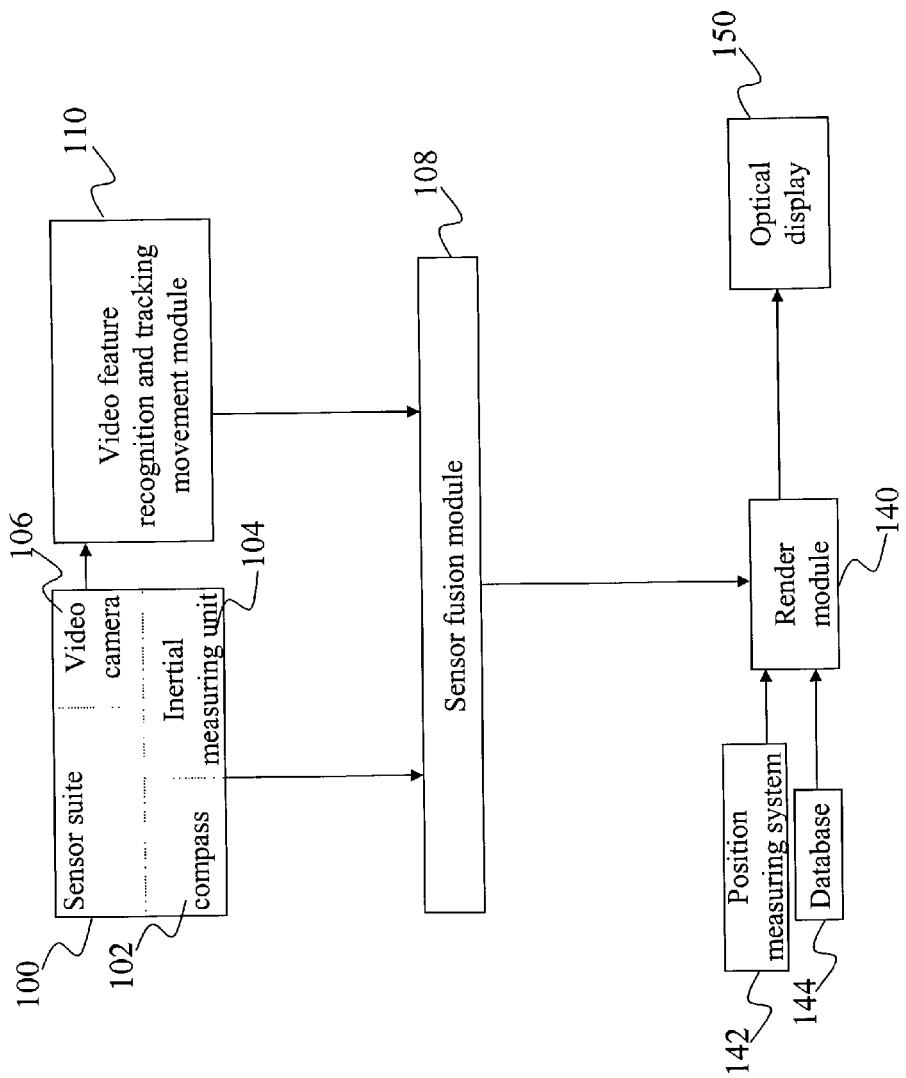
FIG. 1f is a block diagram depicting a modified aspect of the present invention as shown in FIG. 1e, further including a compass.

FIG. 1*f* depicts a modified aspect of the present invention as shown in FIG. 1*e*, wherein the sensor suite 100 is modified to further include a compass 102 for direction detection for increasing the sensor suite 100 accuracy. The sensor fusion module 108 is connected with a sensor suite compass 102 for accepting a sensor suite compass 102 output there from. The sensor fusion module 108 further uses the sensor suite compass 102 output in determining the unified estimate of the user's angular rotation rate and current orientation with increased accuracy.

Figure 1G:
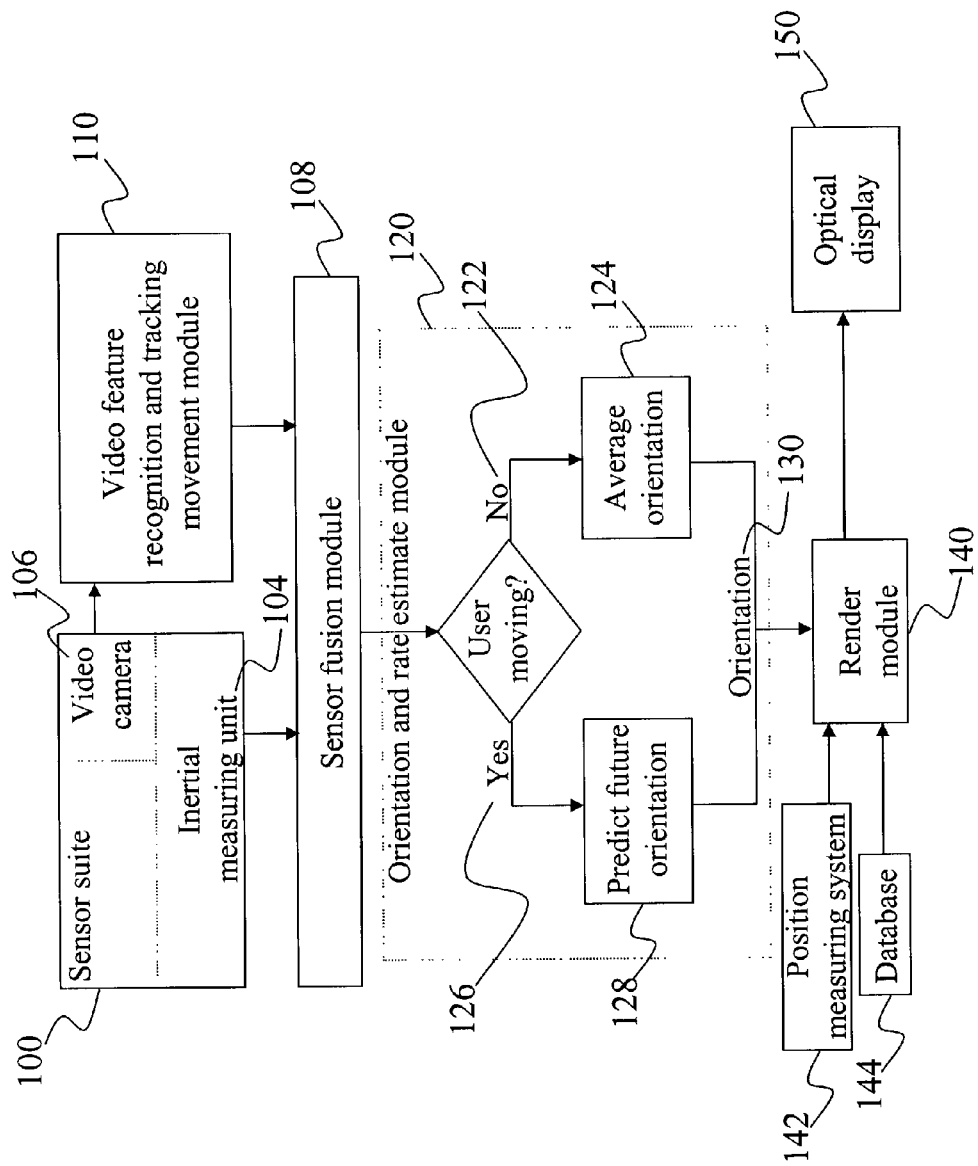
FIG. 1g is a block diagram depicting a modified aspect of the present invention as shown in FIG. 1e, further including an orientation and rate estimator module.

FIG. 1*g* further depicts a modified aspect of the present invention as shown in FIG. 1*e*, wherein the apparatus further includes an orientation and rate estimate module 120.

Figure 1H:
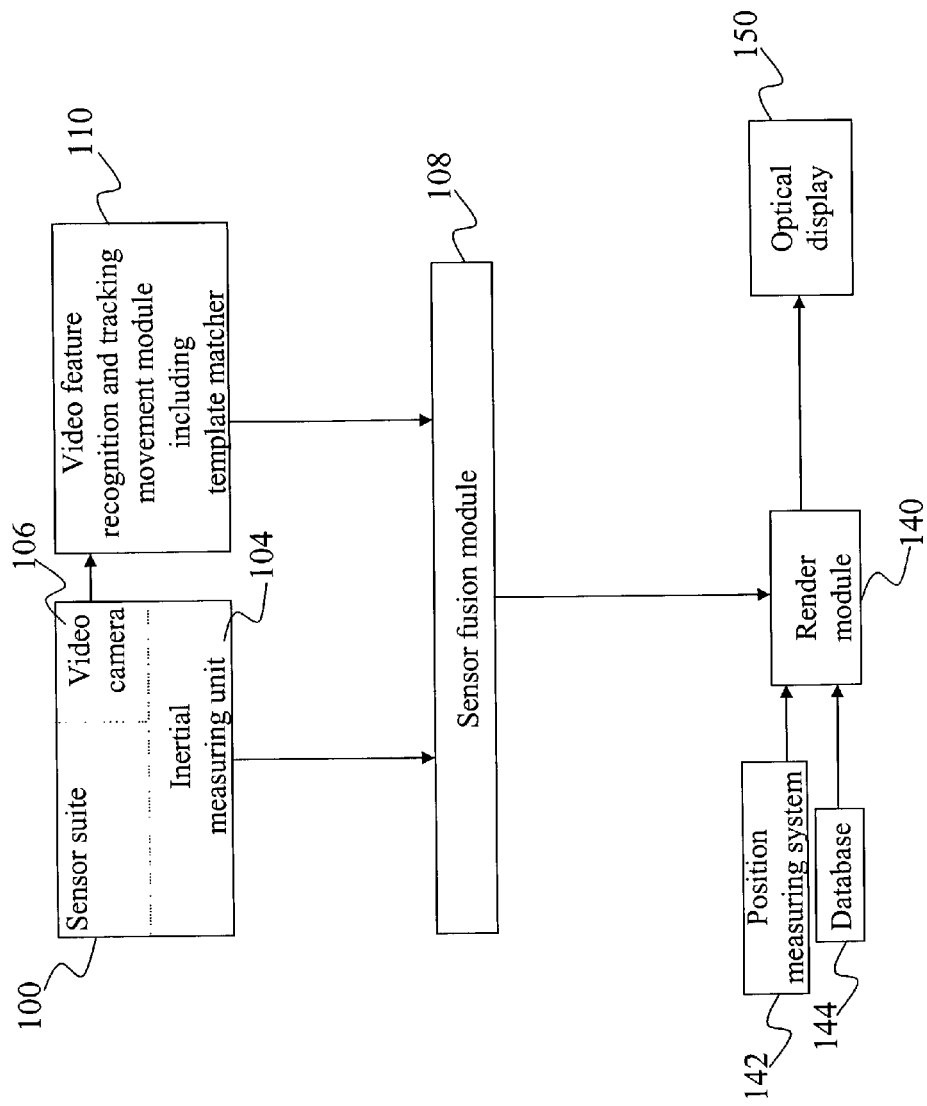
FIG. 1h is a block diagram depicting a modified aspect of the present invention as shown in FIG. 1e, further including a template matcher.

FIG. 1*h* depicts a modified aspect of the present invention as shown in FIG. 1*e*, wherein the video feature recognition and tracking movement module 110 further includes a template matcher for more accurate registration of the video images in measuring the user's current orientation.

Figure 1I:
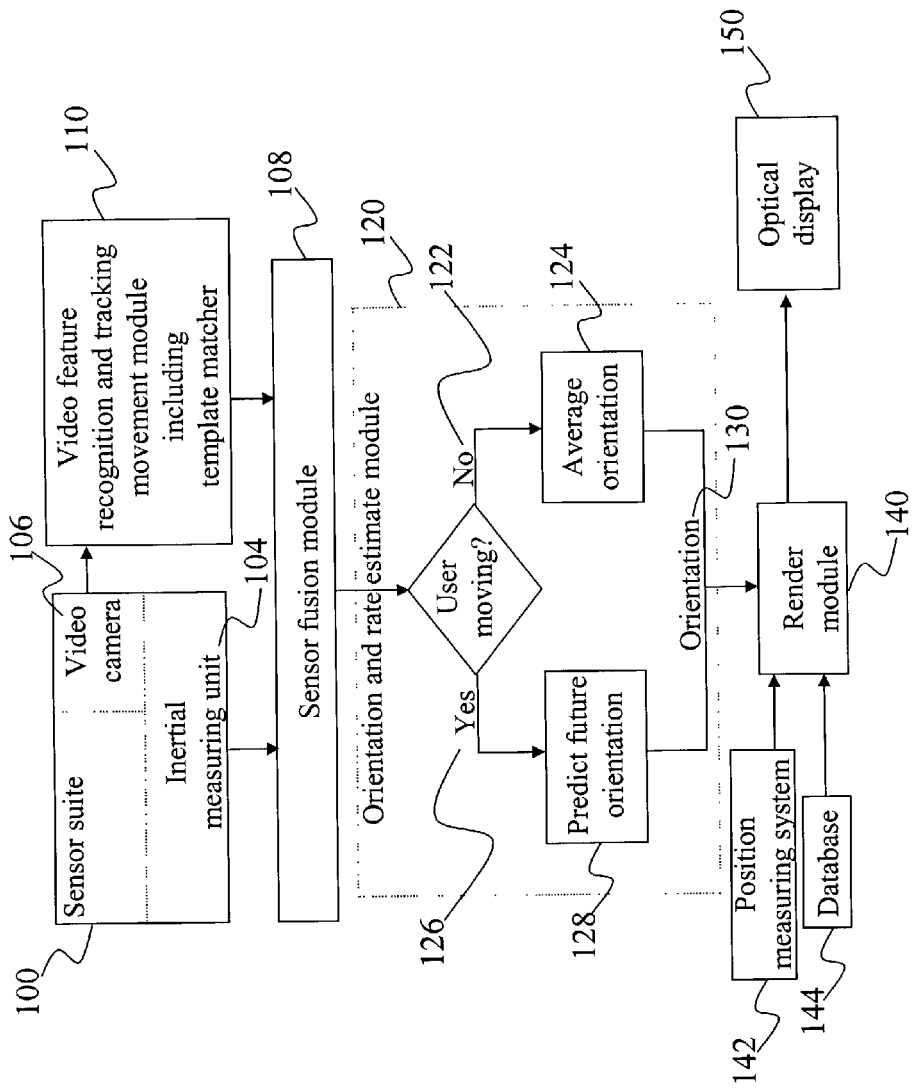
FIG. 1i is a block diagram depicting a modified aspect of the present invention as shown in FIG. 1h, further including an orientation and rate estimator module.

FIG. 1*i* further depicts a modified aspect of the present invention as shown in FIG. 1*h*, wherein the apparatus further includes an orientation and rate estimate module 120.

Figure 1J:
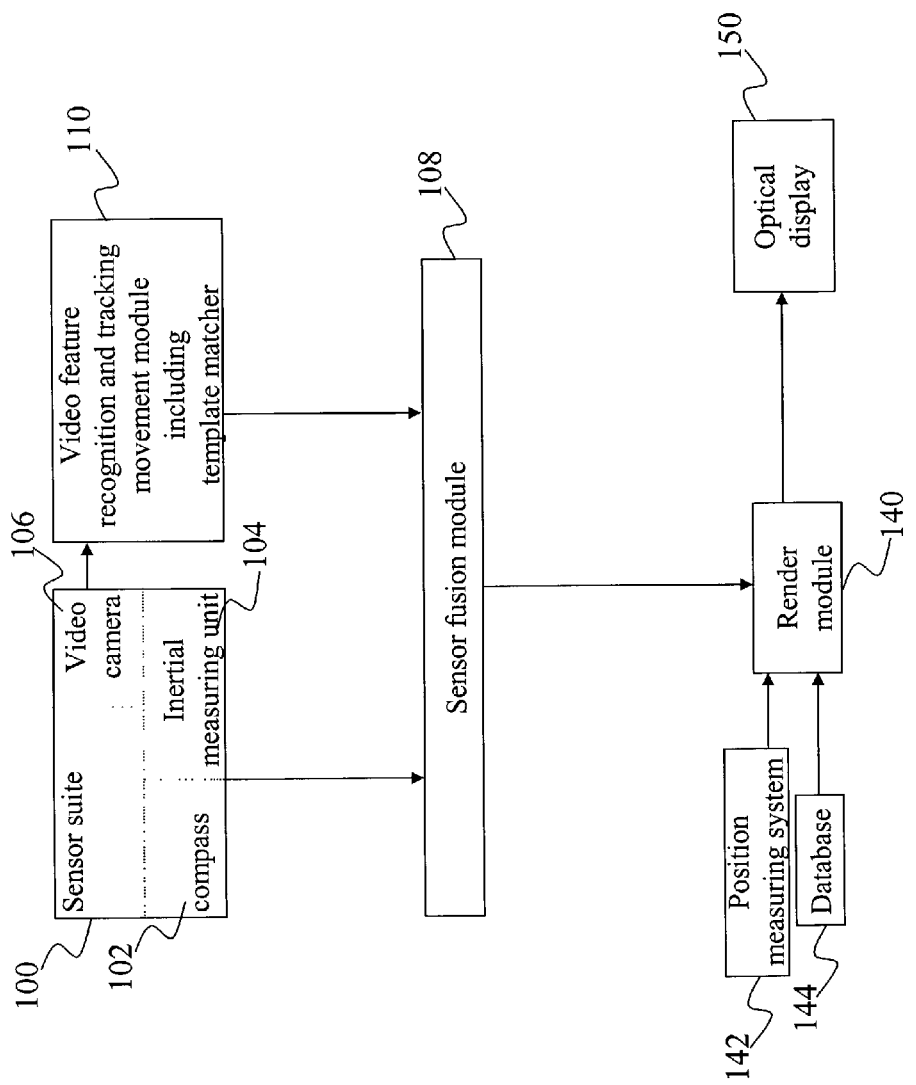
FIG. 1j is a block diagram depicting a modified aspect of the present invention as shown in FIG. 1h, further including a compass.

FIG. 1*j* depicts a modified aspect of the present invention shown in FIG. 1*h*, wherein the sensor suite 100 is modified to further include a compass 102 for direction detection and increasing the sensor suite 100 accuracy.

Figure 1K:
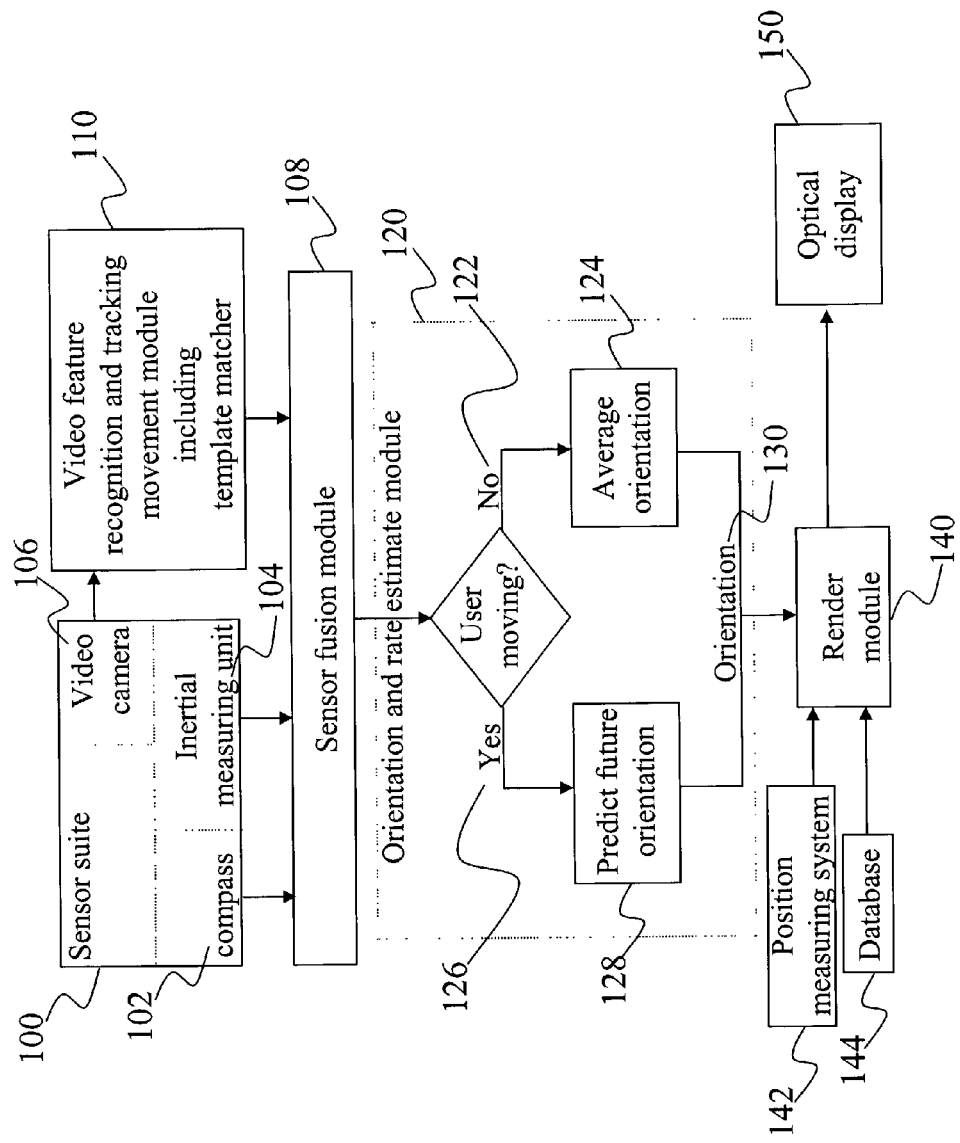
FIG. 1k is a block diagram depicting a modified aspect of the present invention as shown in FIG. 1j, further including an orientation and rate estimator module.

FIG. 1*k* further depicts a modified aspect of the present invention as shown in FIG. 1*j*, wherein the apparatus further includes an orientation and rate estimate module 120.

Specifics of the Present Invention

The aspect shown in FIG. 1*k* comprises the sensor suite 100 for precise measurement of the user's current orientation and the user's angular rotation rate. Drawing graphics to be overlaid over a user's view is not difficult. The difficult task is drawing the graphics in the correct location, at the correct time. Motion prediction can compensate for small amounts of the system delay (from the time that the sensors make a measurement to the time that the output actually appears on the screen). This requires precise measurements of the user's location, accurate tracking of the user's head, and sensing the locations of other objects in the environment. Location is a six-dimension value comprising both position and orientation. Position is the three-dimension component that can be specified in latitude, longitude, and altitude. Orientation is the three-dimension component representing the direction the user is looking, and can be specified as yaw, pitch, and roll (among other representations). The sensor suite 100 is effective for orientation tracking, and may include different types of sensors. Possible sensors include magnetic, ultrasonic, optical, and inertial sensors. Sensors, such as the compass 102 or the inertial measuring units 104, when included, feed the measurements as output into the sensor fusion module 108. Sensors, such as the video camera 106, when included, feed output into the video feature recognition and tracking movement module 110. A general reference on video feature recognition, tracking movement and other techniques is S. You, U. Neumann, & R. Azuma: Hybrid Inertial and Vision Tracking for Augmented Reality Registration. IEEE Virtual Reality '99 Conference (Mar. 13–17, 1999), 260–267, hereby incorporated by reference in its entirety as non-critical information to assist the reader in a better general understanding of these techniques.

The video feature recognition and tracking movement module 110 processes the information received from the video camera 106 using video feature recognition and tracking algorithms. The video feature recognition and tracking movement module 110 is designed to recognize known landmarks in the environment and to detect relative changes in the orientation from frame to frame. A basic concept is to use the compass 102 and the inertial measuring unit 104 for initialization. This initialization or initial guess of location will guide the video feature tracking search algorithm and give a base orientation estimate. As the video tracking finds landmarks, corrections are made for errors in the orientation estimate through the more accurate absolute orientation measurements. When landmarks are not available, the primary reliance is upon the inertial measurement unit 104. The output of the inertial measurement unit 104 will be accurate over the short term but the output will eventually drift away from truth. In other words, after calibration, the inertial measuring unit starts to change from the original calibration. This drift is corrected through both compass measurements and future recognized landmarks. Presently, hybrid systems such as combinations of magnetic, inertial, and optical sensors are useful for accurate sensing. The outputs of the sensor suite 100 and the video feature recognition and tracking movement module 110 are occasional measurements of absolute pitch and heading, along with measurements of relative orientation changes.

The video feature recognition and tracking movement module 110 also provides absolute orientation measurements. These absolute orientation measurements are entered into the fusion filter and override input from the compass/tilt sensor, during the modes when video tracking is operating. Video tracking only occurs when the user fixates on a target and attempts to keep his head still. When the user initially stops moving, the system captures a base orientation, through the last fused compass reading or recognition of a landmark in the video tracking system (via template matching). Then the video tracker repeatedly determines how far the user has rotated away from the base orientation. It adds the amount rotated to the base orientation and sends the new measurement into the filter. The video tracking can be done in one of two ways. It can be based on natural feature tracking which is the tracking of natural features already existing in the scene, where these features are automatically analyzed and selected by the visual tracking system without direct user intervention. This is described in the You, Neumann, and Azuma reference from IEEE VR99. The alternate approach is to use template matching, which is described in more detail below. Hybrid approaches are possible also, such as initially recognizing a landmark through template matching and then tracking the changes in orientation, or orientation movement away from that landmark, through the natural feature tracking.

Registration is aided by calibration. For example in one aspect, the sensor suite 100 needs to be aligned with the optical see-through binoculars. This means determining a roll, pitch, and yaw offset between the sensor coordinate system and the optical see-through binoculars. For pitch and yaw, the binoculars can be located at one known location and aimed to view another known "target" location in its bore sight. A true pitch and yaw can be computed from the two locations. Those can be compared against what the sensor suite reports to determine the offset in yaw and pitch. For roll, the binoculars can be leveled optically by drawing a horizontal line in the display and aligning that against the horizon, then comparing that against the roll reported by the sensor suite to determine an offset. The video camera 106, if used in the aspect, needs to be aligned with the optical see-through binoculars. This can be done mechanically, during construction by aligning video camera to be bore sighted on the same target viewed in the center of the optical see-through. These calibration steps need only be performed once, in the laboratory and not by the end user.

The sensor fusion module 108 receives the output from the sensor suite 100 and optionally from the video feature tracking movement module 110 for orientation tracking. Non-limiting examples of the sensor suite 100 output include output from a compass, gyroscopes, tilt sensors, and/or a video tracking module.

One of the most basic problems limiting AR applications is the registration problem. The objects in the real and virtual worlds must be properly aligned with respect to each other or the illusion that the two worlds coexist will be compromised. Without accurate registration, AR will not be accepted in many applications. Registration errors are difficult to adequately control because of the high accuracy requirements and the numerous sources of error. Magnified optical views would require even more sensitive registration. The sources of error can be divided into two types: static and dynamic. Static errors are the ones that cause registration errors even when the user's viewpoint and the objects in the environment remain completely still. Errors in the reported outputs from the tracking and sensing systems are often the most serious type of static registration errors. Dynamic errors are those that have no effect until either the viewpoint or the objects begin moving. Dynamic errors occur because of system delays, or lags. The end-to-end system delay is defined as the time difference between the moment that the tracking system measures the position and orientation of the viewpoint and the moment when the generated images corresponding to that position and orientation appear in the delays. End-to-end delays cause registration errors only when motion occurs. System delays seriously hurt the illusion that the real and virtual worlds coexist because they cause large registration errors. A method to reduce dynamic registration is to predict future locations. If the future locations are known, the scene can be rendered with these future locations, rather than the measured locations. Then when the scene finally appears, the viewpoints and objects have moved to the predicted locations, and the graphic images are correct at the time they are viewed. Accurate predictions require a system built for real-time measurements and computation. Using inertial sensors can make predictions more accurate by a factor of two to three. However, registration based solely on the information from the tracking system is similar to an "open-loop" controller. Without feedback, it is difficult to build a system that achieves perfect matches. Template matching can aid in achieving more accurate registration. Template images of the real object are taken from a variety of viewpoints. These are used to search the digitized image for the real object. Once a match is found, a virtual wireframe can be superimposed on the real object for achieving more accurate registration. Additional sensors besides video cameras can aid registration.

The sensor fusion module 108 could, as a non-limiting example, be based on a Kalman filter structure to provide weighting for optimal estimation of the current orientation and angular rotation rate. The sensor fusion module 108 output is the unified estimate of the user's current orientation and the user's angular rotation rate that is sent to the orientation and rate estimate module 120.

Figure 2:
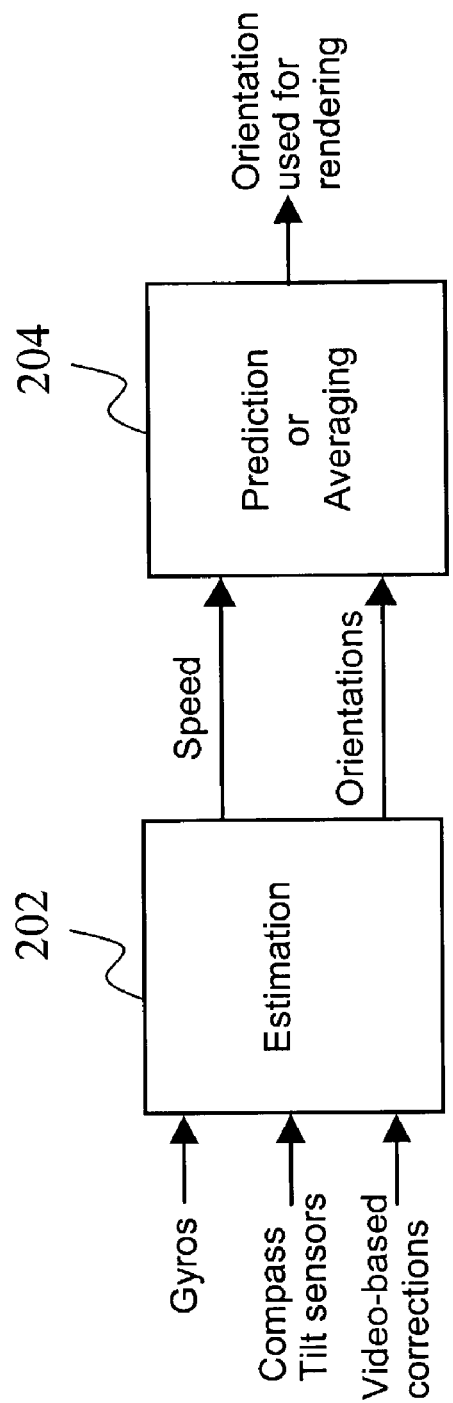
FIG. 2 is an illustration depicting an example of a typical orientation development of an aspect of the present invention.

The estimated rates and orientations are then used for prediction or averaging to generate the orientation used for rendering. FIG. 2 depicts an example of a typical orientation development. The estimation 202 is determined in the sensor fusion module 108 and the prediction or averaging 204 is determined in the orientation and rate estimate module 120. The orientation and rate estimate module 120 operates in two modes. The first mode is the static mode, which occurs when the orientation and rate estimate module 120 determines that the user is not moving 122. An example of this is when a user is trying to gaze at a distant object and tries to keep the binoculars still. The orientation and rate estimate module 120 detects this by noticing that the user's angular rate of rotation has a magnitude below a pre-determined threshold.

The orientation and rate estimate module 120 averages the orientations 124 over a set of iterations and outputs the average orientation 124 as the orientation 130 to the render module 140, thus reducing the amount of jitter and noise in the output. Such averaging may be required at higher magnification when the registration problem is more difficult. The second mode is the dynamic mode, which occurs when the orientation and rate estimate module 120 determines that the user is moving 126. This mode occurs when the orientation and rate estimate module 120 determines that the user is moving 126 or when the user's angular rate of rotation has a magnitude equal to or above the pre-determined threshold. In this case, system delays become a significant issue. The orientation and rate estimate module 120 must predict the future orientation 128 at the time the user sees the graphic images in the display given the user's angular rate and current orientation. The predicted future orientation 128 is the orientation 130 sent to the render module 140 when the user is moving 126.

The choice of prediction or averaging depends upon the operating mode. If the user is fixated on a target, then the user is trying to avoid moving the binoculars. Then the orientation and rate estimate module 120 averages the orientations. However, if the user is rotating rapidly, then the orientation and rate estimate module 120 predicts a future orientation to compensate for the latency in the system. The prediction and averaging algorithms are discussed below.

The way the orientation and rate estimate module 120 estimates can be based on a Kalman filter. One may relate the kinematic variables of head orientation and speed via a discrete-time dynamic system. The "x" is defined as a six dimensional state vector including the three orientation values, as defined for the compass/tilt sensor, and the three speed values, as defined for the gyroscopes, $$x = \begin{bmatrix} r_c & p_c & h_c & r_g & p_g & h_g \end{bmatrix}^T$$

where r, p, and h denote roll, pitch, and heading respectively, and the subscripts c and g denote compass and gyroscope, respectively. The first three values are angles and the last three are angular rates. The "c" subscripted measurements represent measurements of absolute orientation and are generated either by the compass or the video tracking module. The system is written, $$x_{i+1} = A_i x_i + w_i, \qquad (1)$$

$$A_i = \begin{bmatrix} I_{3\times3} & \Delta t A_{12}(x_i) \\ 0_{3\times3} & I_{3\times3} \end{bmatrix},$$

$$A_{12}(x) = \begin{bmatrix} cpc^2r/a^2 & asrcrsp(t^2r + 2/c^2p) & atpc^2r/c^2p \\ 0 & a/cp & -atr \\ 0 & atr/cp & a/c^2p \end{bmatrix},$$

$$a = \frac{1}{\sqrt{1 + t^2p + t^2r}},$$

where $c\theta=\cos(\theta)$, $s\theta=\sin(\theta)$, $t\theta=\tan(\theta)$. For example, $cp=\cos(p)$ and $t^2r=\tan^2(r)$.

r and p are the compass/tilt sensor roll and pitch values ($r_c$ and $p_c$) in x, and $\Delta t$ is the time step (here a non-limiting example is 1 ms). The matrix $A_i$ comes from the definitions of the roll, pitch, heading quantities and the configuration of the gyroscopes.

$A_i$ is a 6 by 6 matrix. In this example, the matrix contains four parts, where each part is a 3 by 3 matrix.

$I_{3\times3}$ is the 3 by 3 identify matrix, i.e.

$$I_{3\times3} = \begin{bmatrix} 1 & 0 & 0 \\ 0 & 1 & 0 \\ 0 & 0 & 1 \end{bmatrix}$$

$0_{3\times3}$ is the 3 by 3 null matrix, i.e.

$$0_{3\times3} = \begin{bmatrix} 0 & 0 & 0 \\ 0 & 0 & 0 \\ 0 & 0 & 0 \end{bmatrix}$$

$A_{12}$ translates small rotations in the sensor suite's frame to small changes in the compass/tilt sensor variables.

The fusion of the sensor inputs is done by a filter equation shown below. It gives an estimate of $x_i$ every time step (every millisecond), by updating the previous estimate. It combines the model prediction given by (1) with a correction given by the sensor input. The filter equation is, $$x_{i+1} = A_i x_i + K_i \left( z_{i+1} - A_i \begin{bmatrix} x_{i-92}^{1-3} \\ x_i^{4-6} \end{bmatrix} \right) \quad (2)$$

where $K_i$ is the gain matrix that weights the sensor input correction term and has the form, $$K_i = K = \begin{bmatrix} g_c I_{3\times 3} & 0_{3\times 3} \\ 0_{3\times 3} & g_g I_{3\times 3} \end{bmatrix}.$$

$g_c$ and $g_g$ are scalar gains parameterizing the gain matrix. $z_{i+1}$ is the vector of sensor inputs, where the first 3 terms are the calibrated compass/tilt sensor measurements (angles) and the last three are the calibrated gyroscope measurements (angular rates). As an example, the compass could have an input of a 92 msec latency, the first 3 terms of $z_{i+1}$ are compared not against the first three terms of the most recent estimated state ($x_i$) but against those terms of the estimate which is 92 msec old. In the preceding expression $$x = \begin{bmatrix} r_c & p_c & h_c & r_g & p_g & h_g \end{bmatrix}^T$$

x is a 6 by 1 matrix, which is defined as a six dimensional state vector. The expression $$\begin{bmatrix} x_{i-92}^{1-3} \\ x_i^{4-6} \end{bmatrix}$$

depicts another 6 by 1 matrix, composed of two 3 by 1 matrices. The first one contains the first 3 elements of the x matrix ($r_c$, $p_c$, $h_c$), as noted by the 1–3 superscript. These are the roll, pitch, and heading values from the compass. The i-92 subscript refers to the iteration value. Each iteration is numbered, and one iteration occurs per millisecond. Therefore, the i-92 means that we are using those 3 values from 92 milliseconds ago. This is due to the latency between the gyroscope and compass sensors. Similarly, in the second matrix, the 4–6 means this is a 3 by 1 matrix using the last three elements of the x matrix ($r_g$, $p_g$, $h_g$), as noted by the 4–6 superscript, and the i subscript means that these values are set from the current iteration. During most time steps, there is no compass/tilt sensor input. In those cases $g_c$ is set to zero, i.e. there is no input from the compass/tilt sensor.

The video feature tracking movement module 110 also provides absolute orientation measurements. These are entered into the fusion filter as the first three entries of measurement vector z. These override input from the compass/tilt sensor, during the modes when video tracking is operating. Video tracking only occurs when the user fixates on a target and attempts to keep his head still. When the user initially stops moving, the system captures a base orientation, through the last fused compass reading or recognition of a landmark in the video feature tracking movement module 110 (via template matching). Then the video feature tracking movement module 110 repeatedly determines how far the user has rotated away from the base orientation. It adds that difference to the base and sends that measurement into the filter through the first three entries of measurement z.

Prediction is a difficult problem. However, simple predictors may use a Kalman filter to extrapolate future orientation, given a base quaternion and measured angular rate and estimated angular acceleration. Examples of these predictors may be found in the reference: Azuma, Ronald and Gary Bishop. Improving Static and Dynamic Registration in an Optical See-Through HMD. Proceedings of SIGGRAPH '94 (Orlando, Fla., 24–29 Jul., 1994), Computer Graphics, Annual Conference Series, 1994, 197–204., hereby incorporated by reference in its entirety as non-critical information to aid the reader in a better general understanding of various predictors. An even simpler predictor breaks orientation into roll, pitch, and yaw. Let y be yaw in radians, and w be the angular rate of rotation in yaw in radians per second. Then given an estimated angular acceleration in yaw a, the prediction interval into the future dt in seconds, the future yaw $y_p$ can be estimated as:

$$y_p = y + w*dt + 0.5*a*dt^2.$$

This is the solution under the assumption that acceleration is constant. The formulas for roll and pitch are analogous.

Averaging orientations can be done in multiple ways. The assumption here is that the user doesn't move very far away from the original orientation, since the user is attempting to keep the binoculars still to view a static target. Therefore the small angle assumption applies and gives us a fair amount of freedom in performing the averaging. One simple approach is to take the original orientation and call that the base orientation. Then for all the orientations in the time period to be averaged, determine the offset in roll, pitch, and yaw from the base orientation. Sum the differences in roll, pitch, and yaw across all the measurements in the desired time interval. Then the averaged orientation is the base orientation rotated by the averaged roll, averaged pitch, and averaged yaw. Due to small angle assumption, the order of application of roll, pitch and yaw does not matter.

The render module 140 receives the predicted future orientation 128 or the average orientation 124 from the orientation and rate estimator module 120 for use in producing the computer generated image of the object to add to the real scene thus reducing location and time displacement in the output.

The position measuring system 142 is effective for position estimation for producing the computer generated image of the object to combine with the real scene, and is connected with the render module 140. A non-limiting example of the position measuring system 142 is a differential GPS. Since the user is viewing targets that are a significant distance away (as through binoculars), the registration error caused by position errors in the position measuring system is minimized.

The database 144 is connected with the render module 140 for providing data for producing the computer generated image of the object to add to the real scene. The data consists of spatially located three-dimension data that are drawn at the correct projected locations in the user's binoculars display. The algorithm for drawing the images, given the position and orientation, is straightforward and may generally be any standard rendering algorithm that is slightly modified to take into account the magnified view through the binoculars. The act of drawing a desired graphics image (the landmark points and maybe some wireframe lines) is very well understood. E.g., given that you have the true position and orientation of the viewer, and you know the 3-D location of a point in space, it is straightforward to use perspective projection to determine the 2-D location of the projected image of that point on the screen. A standard graphics reference that describes this is: Computer Graphics: Principles and Practice ($2^{nd}$ edition). James D. Foley, Andries van Dam, Steven K. Feiner, John F. Hughes. Addison-Wesley, 1990, hereby incorporated by reference in its entirety.

The render module 140 uses the orientation 130, the position from the position measuring system 142, and the data from the database 144 to render the graphic images of the object in the orientation 130 and position to the optical display 150. The optical display 150 receives an optical view of the real scene and combines the optical view of the real scene with the computer generated image of an object. The computer generated image of the object is displayed in the predicted future position and orientation for the user to view through the optical display 150.

Figure 3:
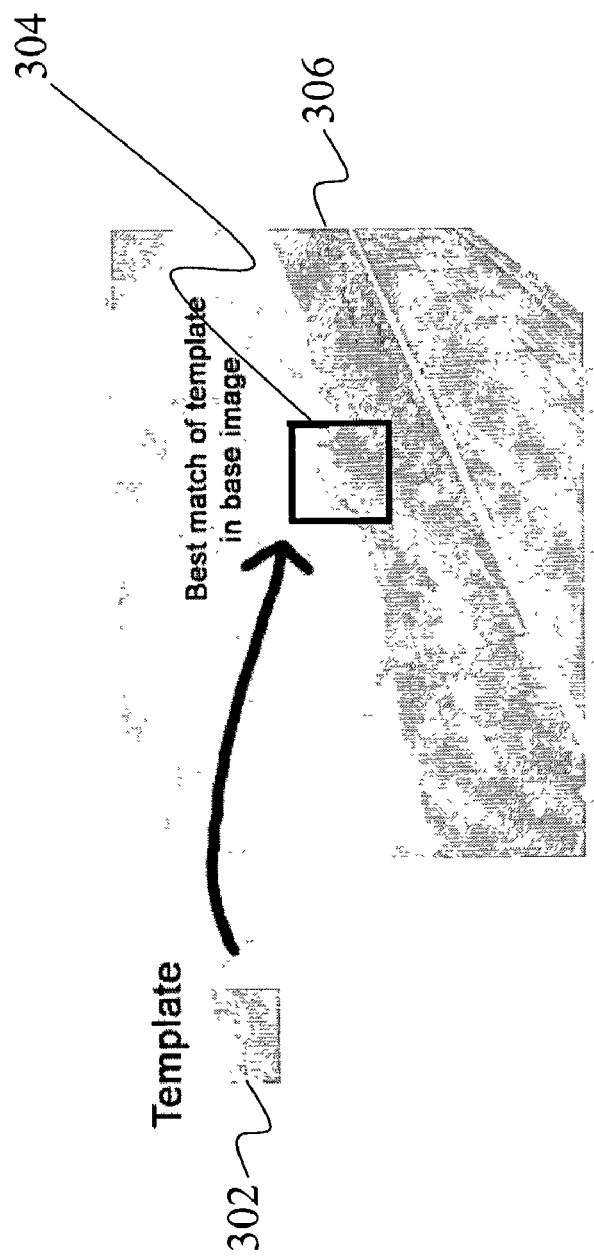
FIG. 3 is an illustration depicting the concept of template matching of an aspect of the present invention.

FIG. 1k depicts an aspect of the present invention further including a template matcher. Template matching is a known computer vision technique for recognizing a section of an image, given a pre-recorded small section of the image. FIG. 3 illustrates the basic concept of template matching. Given a template 302 (the small image section), the goal is to find the location 304 in the large image 306 that best matches the template 302. Template matching is useful to this invention for aiding the registration while the user tries to keep the binoculars still over a target. Once the user stops moving, the vision system records a template 302 from part of the image. Then as the user moves around slightly, the vision tracking system searches for the real world match for the template 302 within the new image. The new location of the real world match for the template 302 tells the sensor fusion system how far the orientation has changed since the template 302 was initially captured. When the user moves rapidly, the system stops trying to match templates and waits until he/she fixates on a target again to capture a new template image. The heart of the template match is the method for determining where the template 302 is located within the large image 304. This can be done in several well-known ways. Two in particular are edge-based matching techniques and intensity-based matching techniques. For edge-based matching techniques, an operator is run over the template and the large image. This operator is designed to identify high contrast features inside the images, such as edges. One example of an operator is the Sobel operator. The output is another image that is typically grayscale with the values of the strength of the edge operator at every point. Then the comparison is done on the edge images, rather than the original images. For intensity-based techniques, the grayscale value of the original source image is used and compared against the template directly. The matching algorithm sums the absolute value of the differences of the intensities at each pixel, where the lower the score, the better the match. Generally, intensity-based matching gives better recognition of when the routine actually finds the true location (vs. a false match), but edge-based approaches are more immune to changes in color, lighting, and other changes from the time that the template 302 was taken. Templates can detect changes in orientation in pitch and yaw, but roll is a problem. Roll causes the image to rotate around the axis perpendicular to the plane of the image. That means doing direct comparisons no longer works. For example, if the image rolls by 45 degrees, the square template 302 would actually have to match against a diamond shaped region in the new image. There are multiple ways of compensating for this. One is to pre-distort the template 302 by rolling it various amounts (e.g. 2.5 degrees, 5.0 degrees, etc.) and comparing these against the image to find the best match. Another is to distort the template 302 dynamically, in real time, based upon the best guess of the current roll value from the sensor fusion module. Template matching does not work well under all circumstances. For example, if the image is effectively featureless (e.g. looking into fog) then there isn't anything to match. That can be detected by seeing that all potential matches have roughly equal scores. Also, if the background image isn't static but instead has many moving features, that also will cause problems. For example, the image might be of a freeway with many moving cars. Then the background image changes with time compared to when the template 302 was originally captured. A general reference on template matching and other techniques is Lisa Gottesfeld Brown, A Survey of Image Registration Techniques. ACM Computing Surveys, vol. 24, #4, 1992, pp. 325–376., hereby incorporated by reference in its entirety.

Figure 4A:
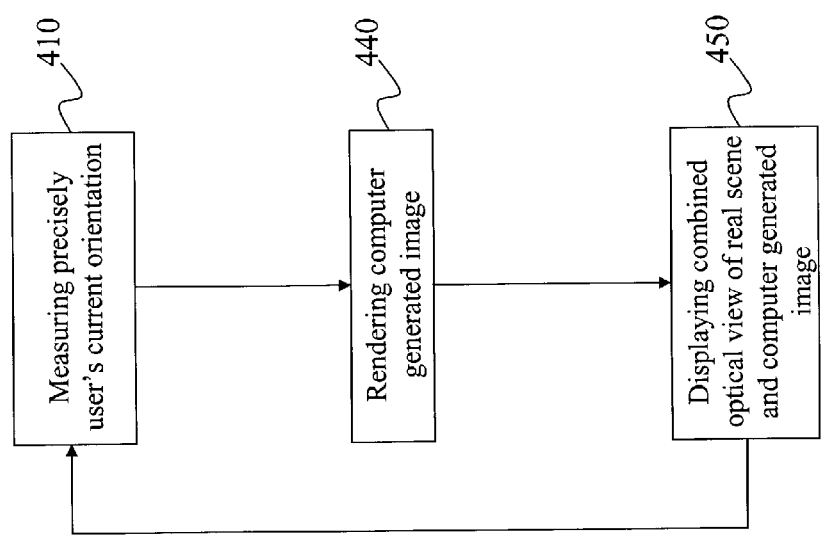
FIG. 4a is a flow diagram depicting the steps in the method of an aspect of the present invention.

A flow diagram depicting the steps in a method of an aspect of the present invention is shown in FIG. 4a. This method for providing an optical see-through imaging through an optical display having variable magnification for producing an augmented image from a real scene and a computer generated image comprises several steps. First, a measuring step 410 is performed, in which a user's current orientation is precisely measured by a sensor suite. Next, in a rendering step 440, a computer generated image is rendered by combining a sensor suite output including the user's current orientation connected with a render module, a position estimation output from a position measuring system connected with the render module, and a data output from a database connected with the render module. Next in a displaying step 450, the optical display, connected with the render module, combines an optical view of the real scene and the computer generated image of an object in a user's current position and orientation for the user to view through the optical display. The steps shown in FIG. 4a are repeated to provide a continual update of the augmented image.

Figure 4B:
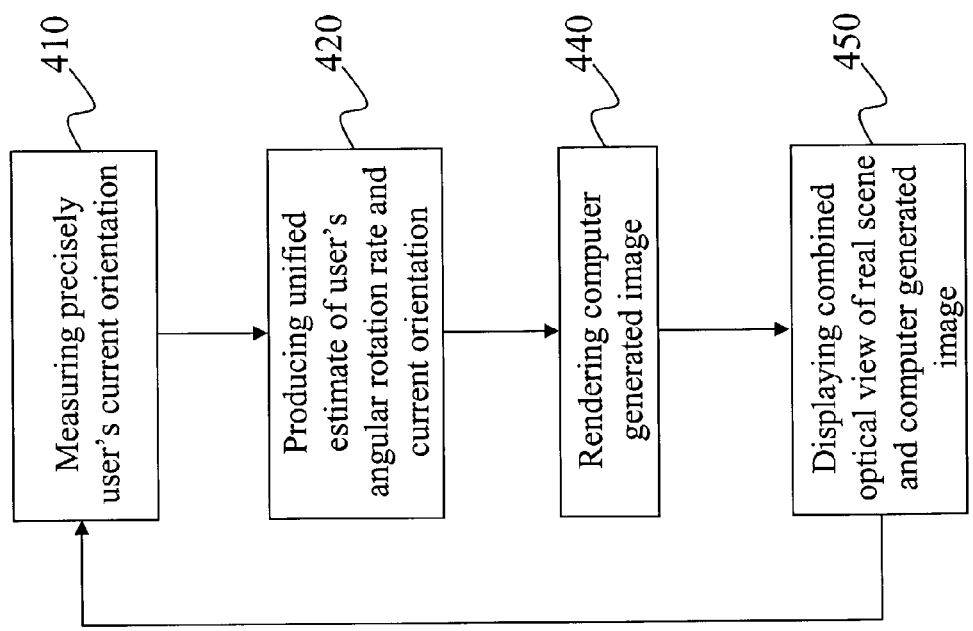
FIG. 4b is a flow diagram depicting the steps in the method of a modified aspect of the present invention shown in FIG. 4a, further including a step of producing a unified estimate.

Another aspect of the method includes an additional estimation producing step 420 shown in FIG. 4b. In this configuration, the sensor suite may include an inertial measuring unit. The estimation producing step 420 is performed wherein a sensor fusion module connected between the sensor suite and the render module and produces a unified estimate of a user's angular rotation rate and current orientation. The unified estimate of the user's angular rotation rate and current orientation is included in the rendering step 440 and the displaying step 450.

In another aspect of the method, the measuring step 410 produces the unified estimate of the angular rotation rate and current orientation with increased accuracy by further including a compass for the sensor suite measurements.

Figure 4C:
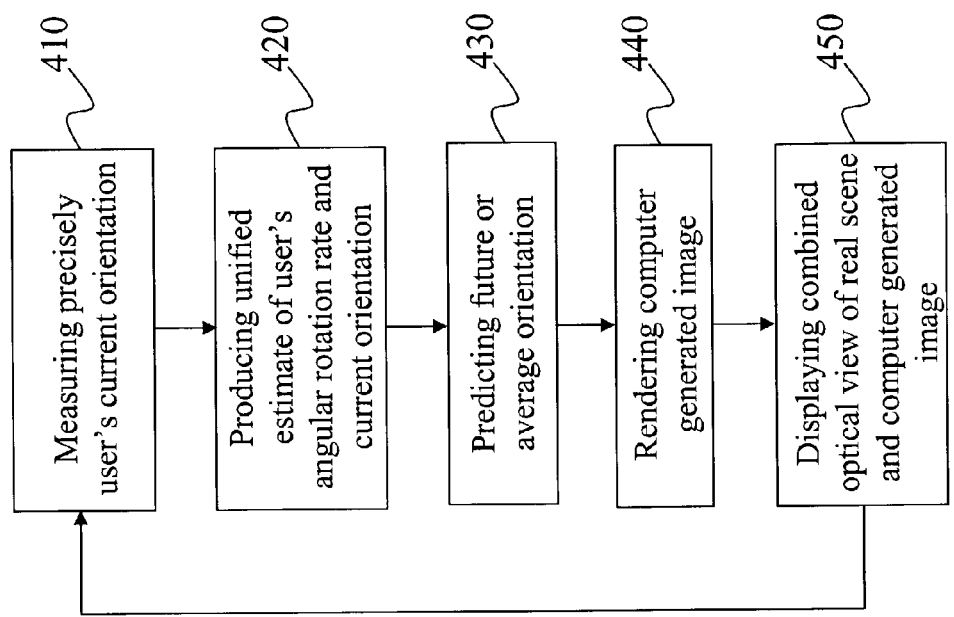
FIG. 4c is a flow diagram depicting the steps in the method of a modified aspect of the present invention shown in FIG. 4b, further including a step of predicting a future orientation.

In another aspect of the method, the method includes a predicting step 430 shown in FIG. 4c. The predicting step 430 includes an orientation and rate estimate module connected with the sensor fusion module and the render module. The predicting step 430 comprises the step of predicting a future orientation at the time a user will view a combined optical view. The orientation and rate estimate module determines if the user is moving and determines a predicted future orientation at the time the user will view the combined optical view. If the user is static, a predicting step 430 is used to predict an average orientation for the time the user will view the combined optical view.

In still another aspect of the method, the measuring step 410 sensor suite further includes a video camera and a video feature recognition and tracking movement module wherein the video feature recognition and tracking movement module receives a sensor suite video camera output from a sensor suite video camera and provides the sensor fusion module measurements to enable the sensor fusion module to produce the unified estimate of the user's angular rotation rate and current orientation with increased accuracy.

Figure 4D:
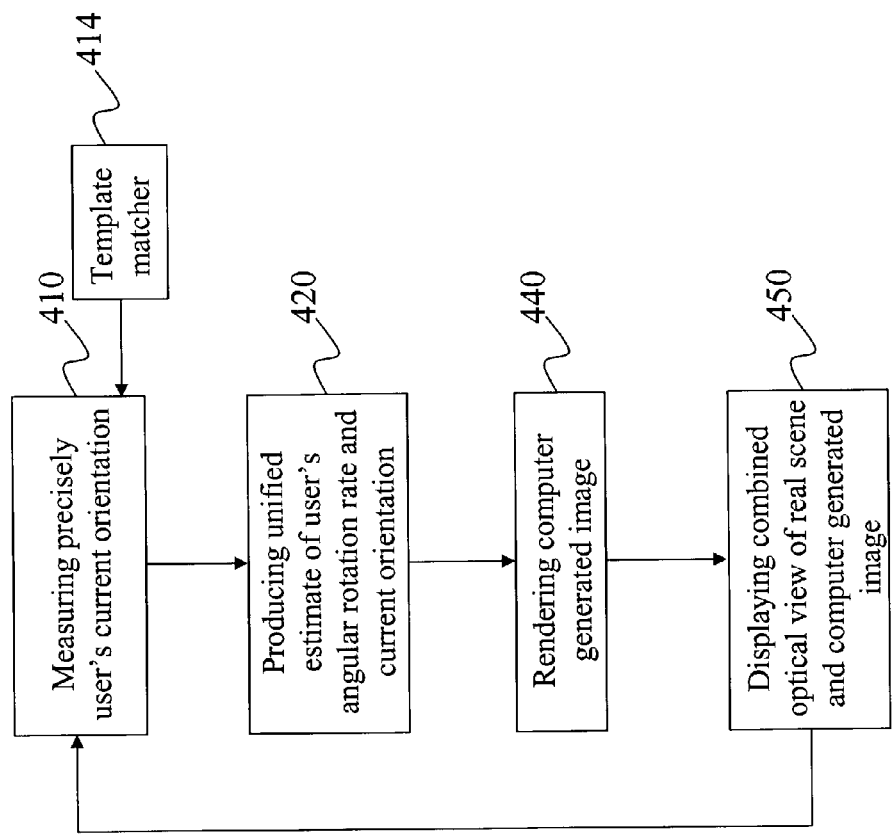
FIG. 4d is a flow diagram depicting the steps in the method of a modified aspect of the present invention shown in FIG. 4b, further including a template matcher sub step.

In another aspect of the method, the sensor suite video feature recognition and tracking movement module used in the measuring step 410 includes a template matcher sub step 414 as shown in FIG. 4d. The video feature recognition and tracking movement module with template matching provides measurements to enable the sensor fusion module to produce a unified estimate of the user's angular rotation rate and current orientation with increased accuracy.

Figure 4E:
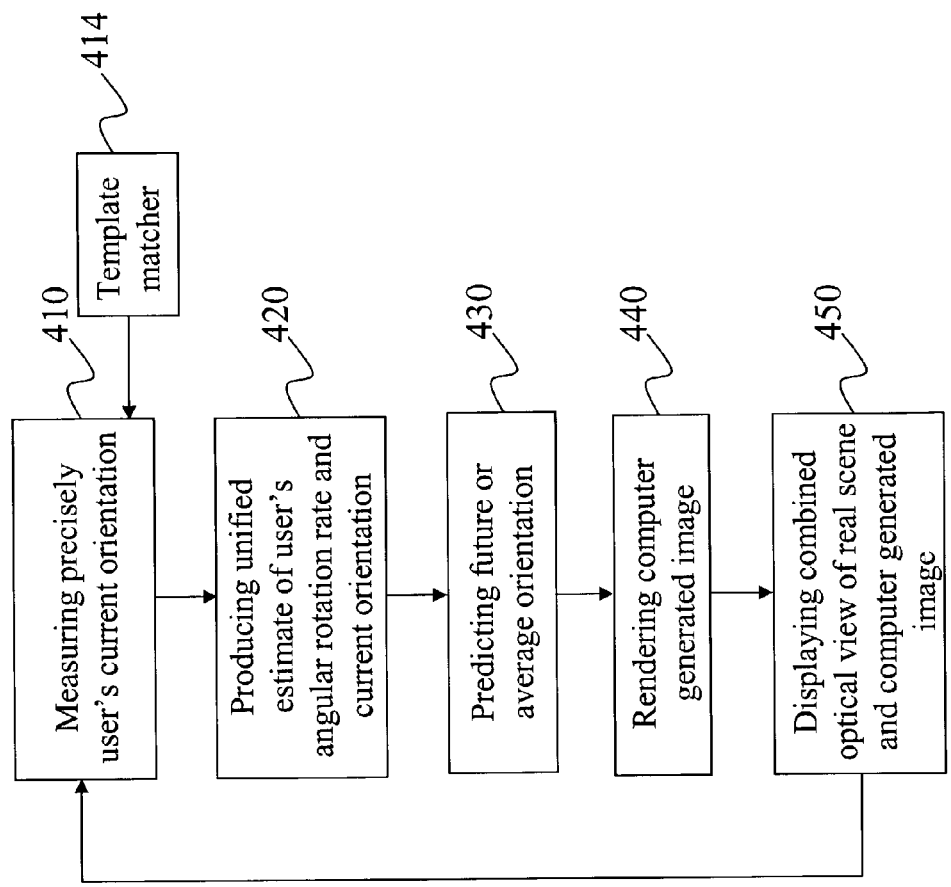
FIG. 4e is a flow diagram depicting the steps in the method of a modified aspect of the present invention shown in FIG. 4c, further including a template matcher sub step.

In still another aspect of the method, the measuring step 410 sensor suite further includes a compass, a video camera, and a video feature recognition and tracking movement module including a template matcher sub step 414 as shown in FIG. 4e. The video feature recognition and tracking movement module with template matching receives a sensor suite video camera output from a sensor suite video camera along with sensor suite output from the inertial measuring unit and the compass and provides the sensor fusion module measurements to enable the sensor fusion module to produce the unified estimate of the user's angular rotation rate and current orientation with increased accuracy to enable the orientation and rate estimate module to predicted future orientation with increased accuracy.

Figure 5:
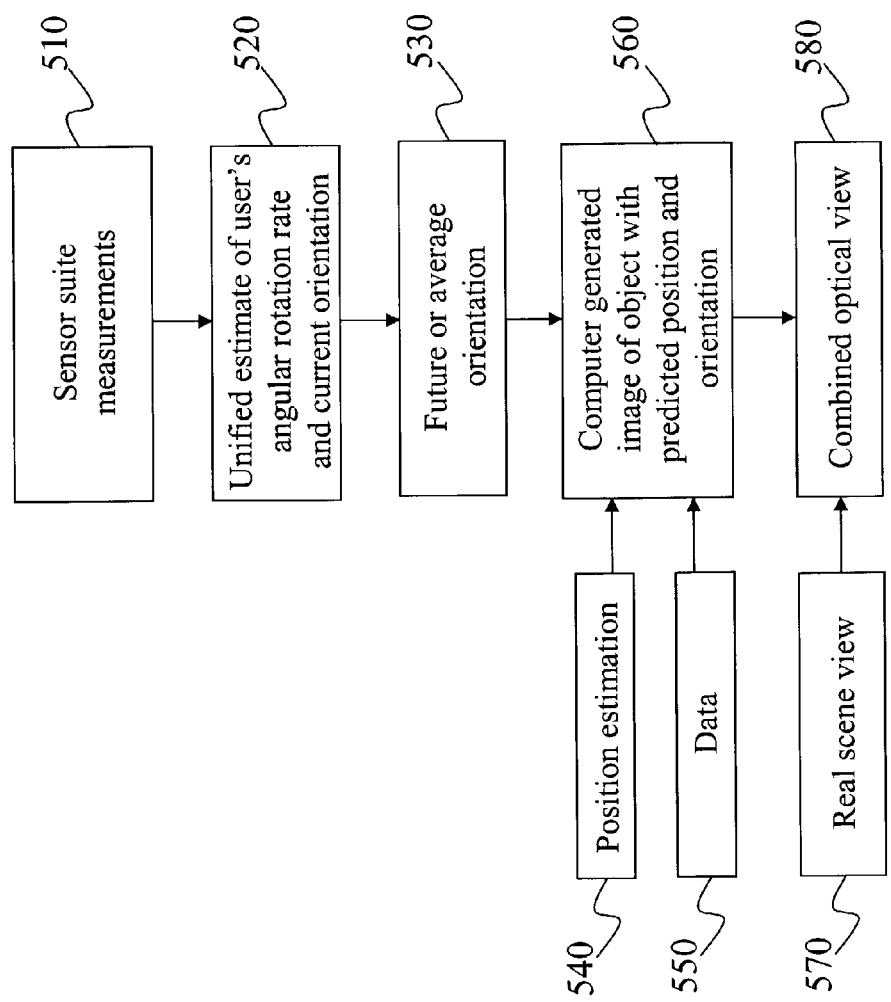
FIG. 5 is a flow diagram depicting the flow and interaction of electronic signals and real scenes of an aspect of the present invention.

A flow diagram depicting the interaction of electronic images with real scenes in an aspect of the present invention is shown in FIG. 5. A sensor suite 100 precisely measures a user's current orientation, angular rotation rate, and position. The sensor suite measurements 510 of the current user's orientation, angular rotation rate, and position are output to a sensor fusion module 108. The sensor fusion module 108 takes the sensor suite measurements and filters them to produce a unified estimate of the user's angular rotation rate and current orientation 520 that is output to an orientation and rate estimation module 120. The orientation and rate estimation module 120 receives the unified estimate of the user's angular rotation rate and current orientation 520 from the orientation and rate estimation module 120 and determines if the sensor suite 100 is static or in motion. If static, the orientation and rate estimation module 120 outputs an average orientation 530 as an orientation 130 to a render module 140, thus reducing the amount of jitter and noise. If the sensor suite 100 is in motion, the orientation and rate estimation module 120 outputs a predicted future orientation 530 to the render module 140 at the time when the user will see an optical view of the real scene. The render module 140 also receives a position estimation output 540 from a position measuring system 142 and a data output 550 from a database 144. The render module 140 then produces a computer generated image of an object in a position and orientation 560, which is then transmitted to an optical display 150. The optical display 150 combines the computer generated image of the object output with a real scene view 570 in order for the user to see a combined optical view 580 as an AR scene.

Figure 6:
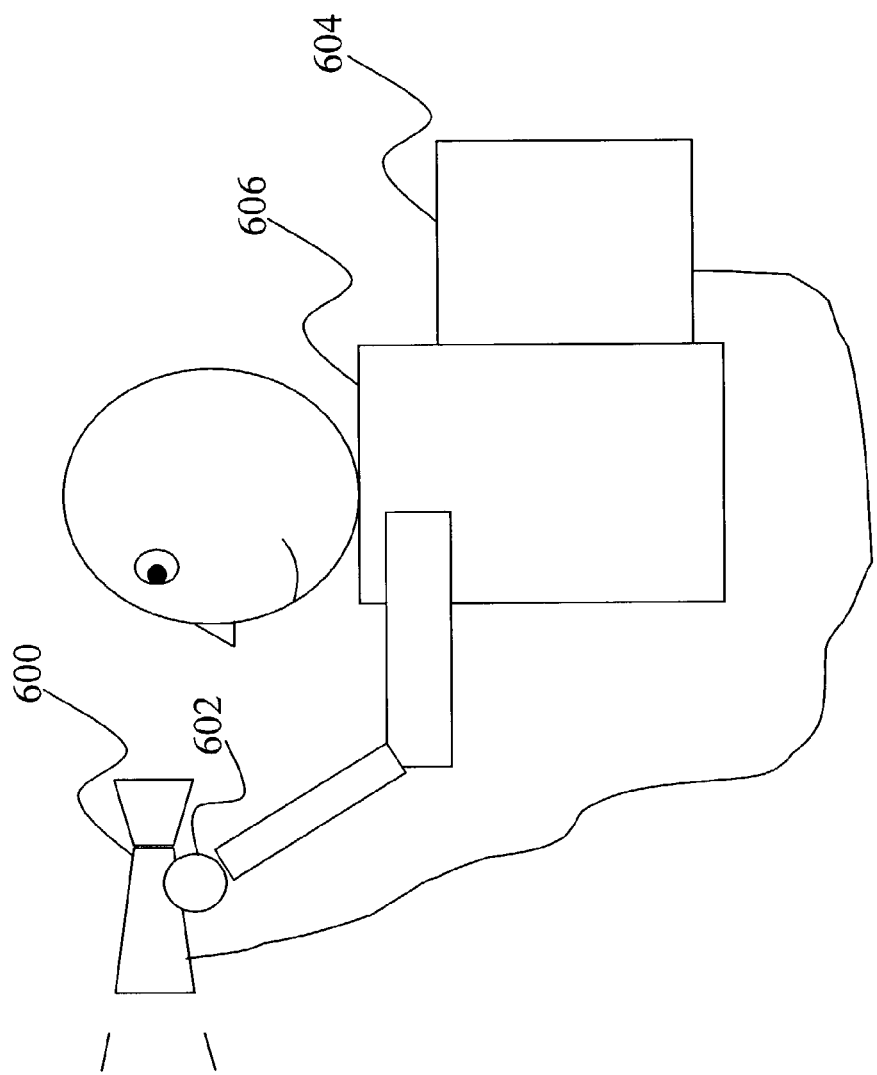
FIG. 6 is an illustration qualitatively depicting the operation of an aspect of the present invention.

An illustrative depiction of an aspect of the present invention in the context of a person holding a hand-held display and sensor pack comprising a hand-held device 600 is shown in FIG. 6. To avoid carrying too much weight in the user's hands 602, the remainder of the system, such as a computer and supporting electronics 604, is typically carried or worn on the user's body 606. Miniaturization of these elements may eliminate this problem. The part of the system carried on the user's body 606 includes the computer used to process the sensor inputs and draw the computer graphics in the display. The batteries, any communication gear, and the differential GPS receiver are also be worn on the body 606 rather than being mounted on the hand-held device 600. In this aspect, the hand-held device 600 includes of a pair of modified binoculars and sensor suite used to track the orientation and possibly the position of the binoculars unit. In this aspect using binoculars, the binoculars must be modified to allow the superimposing of computer graphics upon the user's view of the real world.

Figure 7:
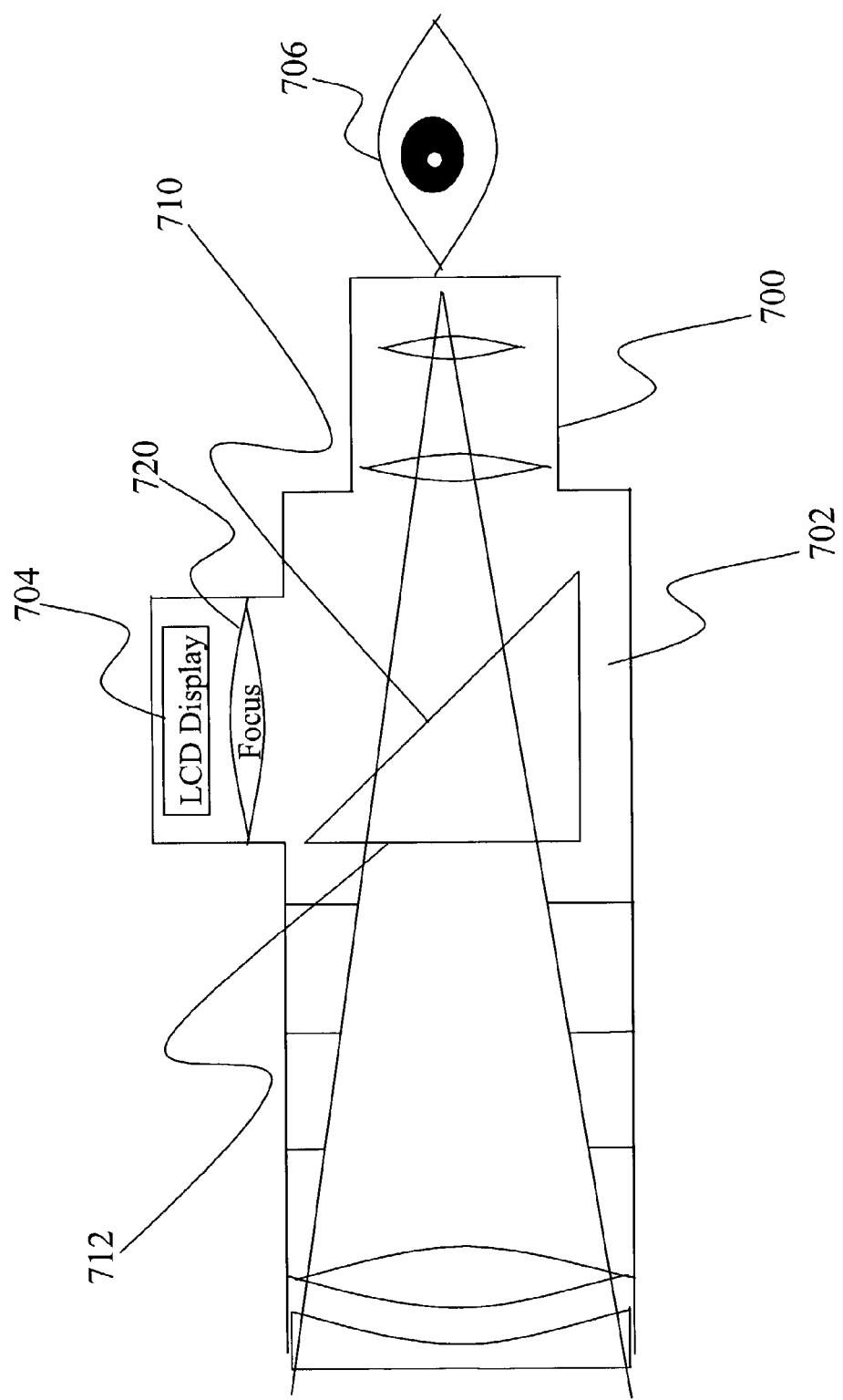
FIG. 7 is an illustration of an optical configuration of an aspect of the present invention.

An example of an optical configuration for the modified binoculars 700 is shown in FIG. 7. The configuration supports superimposing graphics over real world views. The beam splitter 702 serves as a compositor. One side of the angled surface 710 should be coated and near 100% reflective at the wavelengths of the LCD image generator 704. The rear of this surface 712 will be near 100% transmissive for natural light. This allows the graphical image and data produced by the LCD image generator 704 to be superimposed over the real world view at the users eye 706. Because of scale issues, a focusing lens 720 is required between the LCD image generator 704 and the beam splitter 702.

Figure 8:
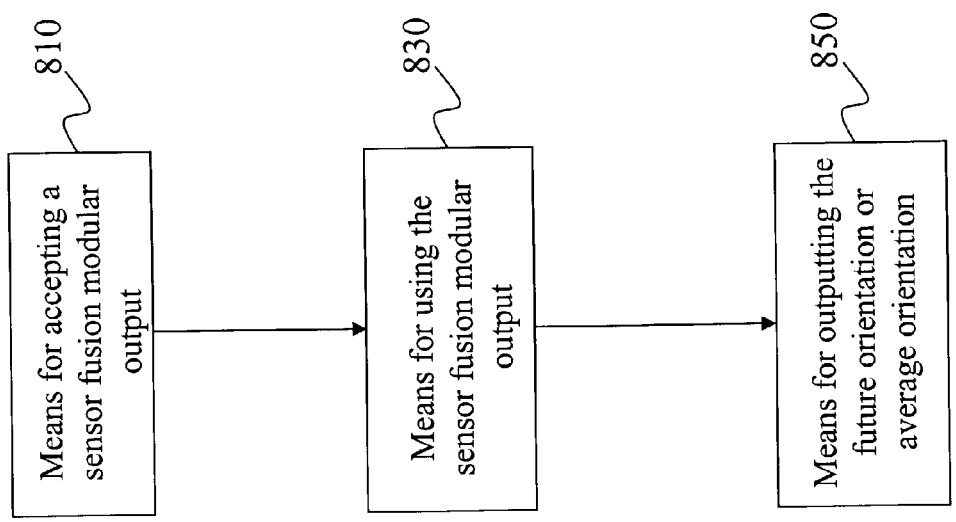
FIG. 8 is a block diagram depicting another aspect of the present invention.

A block diagram depicting another aspect of the present invention is shown in FIG. 8. This aspect comprises an orientation and rate estimator module for use with an optical see-through imaging apparatus. The module comprises a means for accepting a sensor fusion modular output 810 consisting of the unified estimate of the user's angular rotation rate and current orientation; a means for using the sensor fusion modular output to generate a future orientation 830 when the user's angular rotation rate is determined to be above a pre-determined threshold, otherwise the orientation and rate estimator module generates a unified estimate of the user's current orientation to produce an average orientation; and a means for outputting the future orientation or the average orientation 850 from the orientation and rate estimator module for use in the optical see-through imaging apparatus for producing a display based on the unified estimate of the user's angular rotation rate and current orientation.

In another aspect, or aspect, of the present invention, the orientation and rate estimator module is configured to receive output from a sensor fusion modular output wherein the sensor fusion module output includes data selected from selected from the group consisting of an inertial measuring unit output, a compass output, and a video camera output.

Figure 9:
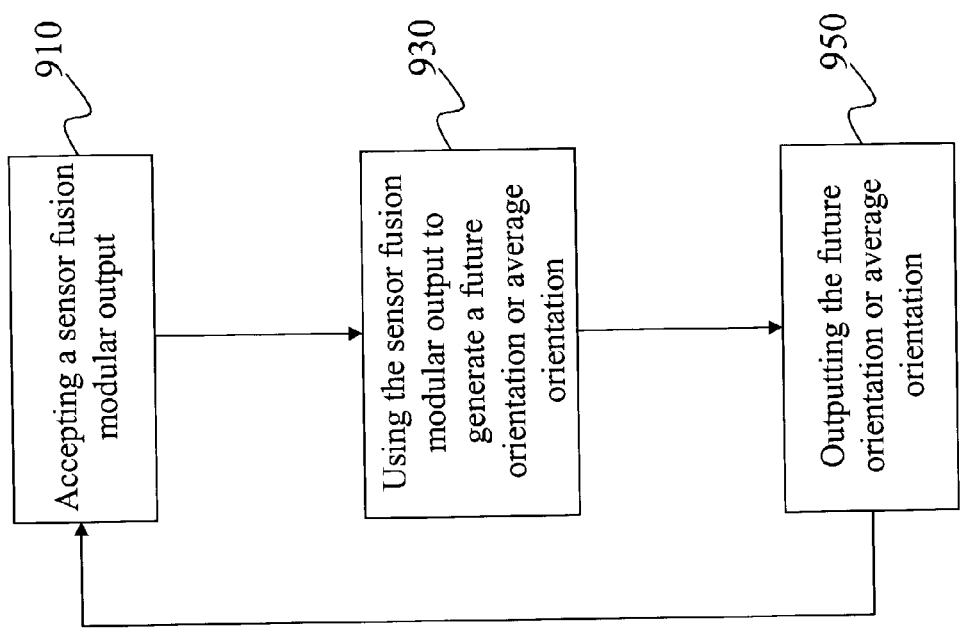
FIG. 9 is a flow diagram depicting the steps in the method of another aspect of the present invention.

A flow diagram depicting the steps in a method of another aspect of the present invention is shown in FIG. 9. This method for orientation and rate estimating for use with an optical see-through image apparatus comprises several steps. First, in an accepting step 910, a sensor fusion modular output consisting of the unified estimate of the user's angular rotation rate and current orientation is accepted. Next, in a using step 930, the sensor fusion modular output is used to generate a future orientation when the user's angular rotation rate is determined to be above a pre-determined threshold, otherwise the orientation and rate estimator module generates a unified estimate of the user's current orientation to produce an average orientation. Next, in an outputting step 950, the future or average orientation is output from the orientation and rate estimator module for use in the optical see-through imaging apparatus for producing a display based on the unified estimate of the user's angular rotation rate and current orientation.

What is claimed is:

1. An optical see-through imaging apparatus having variable magnification for producing an augmented image from a real scene and a computer generated image, the apparatus comprising:
   a. a sensor suite for precise measurement of a user's current orientation;
   b. a render module connected with the sensor suite for receiving a sensor suite output comprising the user's current orientation for use in producing the computer generated image of an object to combine with the real scene;
   c. a position measuring system connected with the render module for providing a position estimation for producing the computer generated image of the object to combine with the real scene;
   d. a database connected with the render module for providing data for producing the computer generated image of the object to combine with the real scene; and
   e. an optical display connected with the render module configured to receive an optical view of the real scene, and for combining the optical view of the real scene with the computer generated image of the object from the render module to produce a display based on the user's current position and orientation for a user to view.

2. An optical see-through imaging apparatus as set forth in claim 1 wherein:
   a. the sensor suite further comprises an inertial measuring unit that includes at least one inertial angular rate sensor;
   b. the apparatus further comprises a sensor fusion module connected with the inertial measuring unit for accepting an inertial measurement including a user's angular rotation rate for use in determining a unified estimate of the user's angular rotation rate and current orientation;
   c. the render module is connected with the sensor fusion module for receiving a sensor fusion module output consisting of the unified estimate of the user's angular rotation rate and current orientation from the sensor fusion module for use in producing the computer generated image of the object to combine with the real scene; and
   d. the optical display further utilizes the unified estimate of the user's angular rotation rate and current orientation from the sensor fusion module to produce the display based on the unified estimate of the user's current position and orientation for a user to view.

3. An optical see-through imaging apparatus as set forth in claim 2 wherein:
   a. the sensor suite further comprises a compass;
   b. the sensor fusion module is connected with a sensor suite compass for accepting a sensor suite compass output from the sensor suite compass; and
   c. the sensor fusion module further uses the sensor suite compass output in determining the unified estimate of the user's angular rotation rate and current orientation with increased accuracy.

4. An optical see-through imaging apparatus as set forth in claim 2 wherein:
   a. the apparatus further comprises an orientation and rate estimator module connected with the sensor fusion module for accepting the sensor fusion module output consisting of the unified estimate of the user's angular rotation rate and current orientation, and when the user's angular rotation rate is determined to be above a pre-determined threshold, the orientation and rate estimator module predicts a future orientation; otherwise the orientation and rate estimator module uses the unified estimate of the user's current orientation to produce an average orientation;
   b. the render module is connected with the orientation and rate estimator module for receiving the predicted future orientation or the average orientation from the orientation and rate estimator module for use in producing the computer generated image of the object to combine with the real scene; and
   c. the optical display is based on the predicted future orientation or the average orientation from the orientation and rate estimator module for the user to view.

5. An optical see-through imaging apparatus as set forth in claim 2 wherein:
   a. the sensor suite further comprises a sensor suite video camera; and
   b. the apparatus further comprises a video feature recognition and tracking movement module connected between the sensor suite video camera and the sensor fusion module, wherein the sensor suite video camera provides a sensor suite video camera output, including video images, to the video feature recognition and tracking movement module, and wherein the video feature recognition and tracking movement module provides a video feature recognition and tracking movement module output to the sensor fusion module, which utilizes the video feature recognition and tracking movement module output to provide increased accuracy in determining the unified estimate of the user's angular rotation rate and current orientation.

6. An optical see-through imaging apparatus as set forth in claim 5 wherein:
   a. the sensor suite further comprises a compass;
   b. the sensor fusion module is connected with a sensor suite compass for accepting a sensor suite compass output from the sensor suite compass; and
   c. the sensor fusion module further uses the sensor suite compass output in determining the unified estimate of the user's angular rotation rate and current orientation with increased accuracy.

7. An optical see-through imaging apparatus as set forth in claim 5 wherein:
   a. the apparatus further comprises an orientation and rate estimator module connected with the sensor fusion module for accepting the sensor fusion module output consisting of the unified estimate of the user's angular rotation rate and current orientation, and when the user's angular rotation rate is determined to be above a pre-determined threshold, the orientation and rate estimator module predicts a future orientation; otherwise the orientation and rate estimator module uses the unified estimate of the user's current orientation to produce an average orientation;
   b. the render module is connected with the orientation and rate estimator module for receiving the predicted future orientation or the average orientation from the orientation and rate estimator module for use in producing the computer generated image of the object to combine with the real scene; and
   c. the optical display is based on the predicted future orientation or the average orientation from the orientation and rate estimator module for the user to view.

8. An optical see-through imaging apparatus as set forth in claim 5, wherein the video feature recognition and tracking movement module further comprises a template matcher for more accurate registration of the video images for measuring the user's current orientation.

9. An optical see-through imaging apparatus as set forth in claim 8 wherein:
   a. the apparatus further comprises an orientation and rate estimator module connected with the sensor fusion module for accepting the sensor fusion module output consisting of the unified estimate of the user's angular rotation rate and current orientation, and when the user's angular rotation rate is determined to be above a pre-determined threshold, the orientation and rate estimator module predicts a future orientation; otherwise the orientation and rate estimator module uses the unified estimate of the user's current orientation to produce an average orientation;
   b. the render module is connected with the orientation and rate estimator module for receiving the predicted future orientation or the average orientation from the orientation and rate estimator module for use in producing the computer generated image of the object to combine with the real scene; and
   c. the optical display is based on the predicted future orientation or the average orientation from the orientation and rate estimator module for the user to view.

10. An optical see-through imaging apparatus as set forth in claim 8 wherein:
    a. the sensor suite further comprises a compass;
    b. the sensor fusion module is connected with a sensor suite compass for accepting a sensor suite compass output from the sensor suite compass; and
    c. the sensor fusion module further uses the sensor suite compass output in determining the unified estimate of the user's angular rotation rate and current orientation with increased accuracy.

11. An optical see-through imaging apparatus as set forth in claim 10 wherein:
    a. the apparatus further comprises an orientation and rate estimator module connected with the sensor fusion module for accepting the sensor fusion module output consisting of the unified estimate of the user's angular rotation rate and current orientation, and when the user's angular rotation rate is determined to be above a pre-determined threshold, the orientation and rate estimator module predicts a future orientation; otherwise the orientation and rate estimator module uses the unified estimate of the user's current orientation to produce an average orientation;
    b. the render module is connected with the orientation and rate estimator module for receiving the predicted future orientation or the average orientation from the orientation and rate estimator module for use in producing the computer generated image of the object to combine with the real scene; and
    c. the optical display is based on the predicted future orientation or the average orientation from the orientation and rate estimator module for the user to view.

12. A method for optical see-through imaging through an optical display having variable magnification for producing an augmented image from a real scene and a computer generated image, the method comprising the steps of:
    a. measuring a user's current orientation by a sensor suite;
    b. rendering the computer generated image by combining a sensor suite output connected with a render module, a position estimation output from a position measuring system connected with the render module, and a data output from a database connected with the render module;
    c. displaying the combined optical view of the real scene and the computer generated image of an object in the user's current position and orientation for the user to view through the optical display connected with the render module; and
    d. repeating the measuring step through the displaying step to provide a continual update of the augmented image.

13. A method for optical see-through imaging through an optical display set forth in claim 12, further comprising the step of:
    a. producing a unified estimate of a user's angular rotation rate and current orientation from a sensor fusion module connected with the sensor suite, wherein the sensor suite includes an inertial measuring unit that includes at least one inertial angular rate sensor for measuring the user's angular rotation rate;
    b. wherein the rendering the computer generated image step includes a unified estimate of the user's angular rotation rate and current orientation from the sensor fusion module; and
    c. wherein the displaying the combined optical view step includes the unified estimate of the user's angular rotation rate and current orientation.

14. A method for optical see-through imaging through an optical display set forth in claim 13, wherein the step of measuring the user's current orientation by a sensor suite includes measuring the user's current orientation using a compass, and wherein the measurements produce the unified estimate of the user's angular rotation rate and current orientation with increased accuracy.

15. A method for optical see-through imaging through an optical display set forth in claim 13:
    a. further comprising the step of predicting a future orientation at the time a user will view a combined optical view by an orientation and rate estimate module connected with and using output from the sensor fusion module when the user's angular rotation rate is determined to be above a pre-determined threshold, otherwise using the unified estimate of the user's current orientation to produce an average orientation;
    b. wherein the rendering the computer generated image step may include a predicted future orientation output from the orientation and rate estimate module; and
    c. wherein the displaying the combined optical view step may include a predicted future orientation.

16. A method for optical see-through imaging through an optical display set forth in claim 13, wherein the step of measuring the user's orientation by a sensor suite further includes measuring the user's orientation using a video camera, and a video feature recognition and tracking movement module wherein the video feature recognition and tracking movement module receives a sensor suite video camera output from a sensor suite video camera and provides the sensor fusion module measurements to enable the sensor fusion module to produce the unified estimate of the user's angular rotation rate and current orientation with increased accuracy.

17. A method for optical see-through imaging through an optical display set forth in claim 16, wherein the step of measuring the user's current orientation by a sensor suite includes measuring the user's current orientation using a compass, and wherein the measurements produce the unified estimate of the user's angular rotation rate and current orientation with increased accuracy.

18. A method for optical see-through imaging through an optical display set forth in claim 16:

a. further comprising the step of predicting a future orientation at the time a user will view a combined optical view by an orientation and rate estimate module connected with and using output from the sensor fusion module when the user's angular rotation rate is determined to be above a pre-determined threshold, otherwise using the unified estimate of the user's current orientation to produce an average orientation;

b. wherein the rendering the computer generated image step may include a predicted future orientation output from the orientation and rate estimate module; and c. wherein the displaying the combined optical view step may include a predicted future orientation.

19. A method for optical see-through imaging through an optical display set forth in claim 16, wherein the step of measuring the user's orientation further includes a template matcher within the video feature recognition and tracking movement module, and provides the sensor fusion module measurements to enable the sensor fusion module to produce the unified estimate of the user's angular rotation rate and current orientation with increased accuracy.

20. A method for optical see-through imaging through an optical display set forth in claim 19:

a. further comprising the step of predicting a future orientation at the time a user will view a combined optical view by an orientation and rate estimate module connected with and using output from the sensor fusion module when the user's angular rotation rate is determined to be above a pre-determined threshold, otherwise using the unified estimate of the user's current orientation to produce an average orientation;

b. wherein the rendering the computer generated image step may include a predicted future orientation output from the orientation and rate estimate module; and c. wherein the displaying the combined optical view step may include a predicted future orientation.

21. A method for optical see-through imaging through an optical display set forth in claim 19, wherein the step of measuring the user's current orientation by a sensor suite includes measuring the user's current orientation using a compass, and wherein the measurements produce the unified estimate of the user's angular rotation rate and current orientation with increased accuracy.

22. A method for optical see-through imaging through an optical display set forth in claim 21:

a. further comprising the step of predicting a future orientation at the time a user will view a combined optical view by an orientation and rate estimate module connected with and using output from the sensor fusion module when the user's angular rotation rate is determined to be above a pre-determined threshold, otherwise using the unified estimate of the user's current orientation to produce an average orientation;

b. wherein the rendering the computer generated image step may include a predicted future orientation output from the orientation and rate estimate module; and c. wherein the displaying the combined optical view step may include a predicted future orientation.

23. An orientation and rate estimator module for use with an optical see-through imaging apparatus, the module comprising:

a. a means for accepting a sensor fusion modular output consisting of a unified estimate of a user's angular rotation rate and current orientation;

b. a means for using the sensor fusion modular output to generate a future orientation when the user's angular rotation rate is determined to be above a pre-determined threshold, otherwise the orientation and rate estimator module generates a unified estimate of the user's current orientation to produce an average orientation; and c. a means for outputting the future orientation or the average orientation from the orientation and rate estimator module for use in the optical see-through imaging apparatus for producing a display based on the unified estimate of the user's angular rotation rate and current orientation.

24. An orientation and rate estimator module as set forth in claim 23, wherein the orientation and rate estimator module is configured to receive a sensor fusion module output wherein the sensor fusion module output includes data selected from the group consisting of an inertial measuring unit output, a compass output, and a video camera output.

25. A method for orientation and rate estimating for use with an optical see-through image apparatus, the method comprising the steps of:

a. accepting a sensor fusion modular output consisting of the unified estimate of the user's angular rotation rate and current orientation;

b. using the sensor fusion modular output to generate a future orientation when the user's angular rotation rate is determined to be above a pre-determined threshold, otherwise generating a unified estimate of the user's current orientation to produce an average orientation; and c. outputting the future orientation or the average orientation from the orientation and rate estimator module for use in the optical see-through imaging apparatus for producing a display based on the unified estimate of the user's angular rotation rate and current orientation.

* * * * *